(12) United States Patent  
Tu

(10) Patent No.: US 12,082,746 B2  
(45) Date of Patent: Sep. 10, 2024

(54) CONTAINER FOR FOOD PROCESSING SYSTEM

(71) Applicant: SHARKNINJA OPERATING LLC, Needham, MA (US)

(72) Inventor: Joyce Chien Tu, Melrose, MA (US)

(73) Assignee: SharkNinja Operating LLC, Needham, MA (US)

( * ) Notice: Subject to any disclaimer, the term of this patent is extended or adjusted under 35 U.S.C. 154(b) by 479 days.

(21) Appl. No.: 17/526,232

(22) Filed: Nov. 15, 2021

(65) Prior Publication Data

US 2022/0142411 A1  May 12, 2022

Related U.S. Application Data

(63) Continuation of application No. 17/179,162, filed on Feb. 18, 2021, now Pat. No. 11,172,786.

(51) Int. Cl.
*A47J 43/00* (2006.01)
*A47J 43/046* (2006.01)
*A47J 43/07* (2006.01)

(52) U.S. Cl.
CPC ......... *A47J 43/0727* (2013.01); *A47J 43/046* (2013.01); *A47J 43/0722* (2013.01)

(58) Field of Classification Search
CPC ... A47J 43/0727; A47J 43/046; A47J 43/0722
See application file for complete search history.

(56) References Cited

U.S. PATENT DOCUMENTS

| 1,174,828 | A | 3/1916 | Copeland |
| D200,494 | S | 3/1965 | Bezark |
| 3,373,975 | A | 3/1968 | Congdon |
| 3,415,497 | A | 12/1968 | Johnson |
| 3,417,972 | A | 12/1968 | Conway |
| 3,434,518 | A | 3/1969 | Motis |
| 3,537,691 | A | 11/1970 | Miwa et al. |

(Continued)

FOREIGN PATENT DOCUMENTS

| CA | 164836 | 8/2016 |
| CN | 204734381 | 11/2015 |

(Continued)

OTHER PUBLICATIONS

Ninja SS101 Nutrient Extractor, posted at Amazon.com on Aug. 18, 2020, [site visited Aug. 8, 2022]. Available from internet, URL: <https://www.amazon.com/Ninja-SS 101-smartTORQU E-multi-functions-Stainless/dp/B08C1 Dj N R2/> (Year: 2020).

(Continued)

*Primary Examiner* — Anshu Bhatia
(74) *Attorney, Agent, or Firm* — The Webb Law Firm

(57) ABSTRACT

An attachment for use with a food processing system includes a container body having a sidewall, a first end configured to be mounted to a food processing base, and a second end remote of said first end. The first end is open and the second end is at least partially open. A chamber is defined by said container body and an agitating member is receivable at the first end. A displacement member is arranged at the second end to seal the second end. The displacement member is extendable into the chamber from the second end to increase a pressure within the chamber.

20 Claims, 20 Drawing Sheets

(56) References Cited

U.S. PATENT DOCUMENTS

| | | |
|---|---|---|
| 3,627,008 A | 12/1971 | Samuelian |
| 3,933,315 A | 1/1976 | Popeil |
| 3,957,215 A | 5/1976 | Otto |
| 4,100,612 A | 7/1978 | Hoover et al. |
| 4,417,506 A | 11/1983 | Herbst |
| D281,945 S | 12/1985 | Boyce et al. |
| 4,561,782 A | 12/1985 | Jacobsen et al. |
| 4,878,627 A | 11/1989 | Otto |
| 4,946,285 A | 8/1990 | Vennemeyer |
| D327,256 S | 6/1992 | Bannister et al. |
| 5,302,021 A | 4/1994 | Jennett et al. |
| 5,360,170 A | 11/1994 | Cartellone |
| 5,383,613 A | 1/1995 | Sundquist |
| 5,549,385 A | 8/1996 | Goncalves |
| 6,527,433 B2 | 3/2003 | Daniels, Jr. |
| 6,585,179 B2 | 7/2003 | Weibel et al. |
| D489,501 S | 5/2004 | Dretzka |
| 6,935,767 B2 | 8/2005 | Nikkhah |
| 6,994,465 B2 | 2/2006 | Tague et al. |
| D517,862 S | 3/2006 | Sands |
| D518,994 S | 4/2006 | Lin |
| 7,040,799 B2 | 5/2006 | Pryor |
| 7,100,854 B2 | 9/2006 | Aby-Eva et al. |
| D545,126 S | 6/2007 | White |
| D595,084 S | 6/2009 | Metaxatos et al. |
| 7,648,264 B2 | 1/2010 | Breviere et al. |
| D624,359 S | 9/2010 | Schleinzer |
| 8,056,848 B1 | 11/2011 | Liang |
| D655,133 S | 3/2012 | Brinckerhoff et al. |
| D668,114 S | 10/2012 | Cozzolino et al. |
| D684,817 S | 6/2013 | Leavitt |
| D690,152 S | 9/2013 | Palermo et al. |
| D690,159 S | 9/2013 | Gursel et al. |
| D700,013 S | 2/2014 | Chu |
| 8,794,822 B2 | 8/2014 | Serra |
| D725,969 S | 4/2015 | Garner |
| D734,988 S | 7/2015 | Smith |
| D737,629 S | 9/2015 | Sands |
| D738,685 S | 9/2015 | Sands |
| D749,893 S | 2/2016 | Bazzicalupo et al. |
| D750,436 S | 3/2016 | Hopkins et al. |
| D758,799 S | 6/2016 | Audette |
| D760,026 S | 6/2016 | Smith et al. |
| D761,056 S | 7/2016 | Kemker |
| D770,228 S | 11/2016 | Pan |
| D770,231 S | 11/2016 | Hume et al. |
| D775,892 S | 1/2017 | Smith |
| 9,560,936 B2 | 2/2017 | Wade et al. |
| D782,866 S | 4/2017 | Suess et al. |
| D783,353 S | 4/2017 | Smith |
| D783,355 S | 4/2017 | Tu |
| 9,656,227 B2 | 5/2017 | Paget |
| D788,527 S | 6/2017 | Smith et al. |
| D790,275 S | 6/2017 | Audette |
| D793,803 S | 8/2017 | Patel |
| 9,750,372 B2 | 9/2017 | Foxlee et al. |
| 9,770,133 B2 | 9/2017 | Dickson, Jr. et al. |
| D798,668 S | 10/2017 | Steel |
| D800,498 S | 10/2017 | Lee |
| D800,499 S | 10/2017 | Repac |
| D803,001 S | 11/2017 | Bodum |
| D803,622 S | 11/2017 | Tu |
| D813,604 S | 3/2018 | Tu |
| D813,606 S | 3/2018 | O'Nan et al. |
| D817,082 S | 5/2018 | Lee |
| D817,701 S | 5/2018 | Ho |
| D828,080 S | 9/2018 | Ou et al. |
| D832,641 S | 11/2018 | Sapire |
| D836,385 S | 12/2018 | Arzunyan |
| D839,042 S | 1/2019 | Krivos et al. |
| D844,374 S | 4/2019 | McConnell et al. |
| D846,339 S | 4/2019 | Smith |
| D852,574 S | 7/2019 | McConnell et al. |
| 10,357,131 B2 | 7/2019 | Dickson, Jr. et al. |
| 10,383,482 B1 | 8/2019 | Pamplin |
| 10,427,116 B2 | 10/2019 | Altenritter et al. |
| D865,935 S | 11/2019 | Hu |
| D871,831 S | 1/2020 | Liu |
| D877,652 S | 3/2020 | Hung |
| D878,862 S | 3/2020 | Kettavong et al. |
| D885,116 S | 5/2020 | Krivos et al. |
| 10,638,884 B2 | 5/2020 | Zakowski et al. |
| 10,653,274 B2 | 5/2020 | Brunner |
| D889,191 S | 7/2020 | Finnance |
| D889,192 S | 7/2020 | Finnance |
| 10,792,630 B1 | 10/2020 | Pamplin |
| 10,799,070 B2 | 10/2020 | Koscak |
| 10,905,285 B2 | 2/2021 | Zakowski |
| D913,033 S | 3/2021 | Jones |
| D914,453 S | 3/2021 | Kettavong et al. |
| D919,359 S | 5/2021 | Seo et al. |
| D921,418 S | 6/2021 | Thun et al. |
| D921,419 S | 6/2021 | Yang |
| D925,271 S | 7/2021 | Palladino et al. |
| D925,981 S | 7/2021 | McConnell et al. |
| D927,254 S | 8/2021 | Chen |
| D932,242 S | 10/2021 | Finnance |
| 11,172,786 B2 | 11/2021 | Tu |
| D937,624 S | 12/2021 | Tu et al. |
| D938,220 S | 12/2021 | Tu et al. |
| 11,241,119 B2 | 2/2022 | Roberts et al. |
| D948,940 S | 4/2022 | Pamplin |
| D951,007 S | 5/2022 | Yang |
| D956,471 S | 7/2022 | Tu |
| D969,535 S | 11/2022 | Tu et al. |
| D974,841 S | 1/2023 | Pamplin |
| D979,321 S | 2/2023 | Coakley |
| D982,971 S | 4/2023 | Tu |
| D984,210 S | 4/2023 | Tu et al. |
| D985,330 S | 5/2023 | Tu et al. |
| D992,338 S | 7/2023 | Tu et al. |
| D999,020 S | 9/2023 | Tu et al. |
| D999,589 S | 9/2023 | Tu et al. |
| 11,779,162 B1 * | 10/2023 | Full .................. A47J 43/288 |
| | | 241/101.2 |
| 2003/0099154 A1 | 5/2003 | Daniels |
| 2004/0206837 A1 | 10/2004 | Lee |
| 2004/0264294 A1 | 12/2004 | Pryor |
| 2005/0205704 A1 | 9/2005 | Yurchenco et al. |
| 2009/0129200 A1 | 5/2009 | Breviere |
| 2009/0193982 A1 | 8/2009 | Chou |
| 2012/0080549 A1 | 4/2012 | Rukavina |
| 2014/0241109 A1 | 8/2014 | Paget |
| 2015/0036458 A1 | 2/2015 | Holm |
| 2015/0250360 A1 | 9/2015 | Hyp |
| 2015/0272394 A1 | 10/2015 | Lin et al. |
| 2015/0272395 A1 | 10/2015 | Dahlback et al. |
| 2015/0374175 A1 | 12/2015 | Garr |
| 2016/0045073 A1 * | 2/2016 | Kozlowski .......... A47J 43/046 |
| | | 366/182.1 |
| 2016/0256010 A1 | 9/2016 | Le |
| 2017/0035250 A1 | 2/2017 | Pan |
| 2017/0224168 A1 | 8/2017 | Lin et al. |
| 2018/0014693 A1 | 1/2018 | Dickson, Jr. |
| 2018/0028020 A1 | 2/2018 | Sapire et al. |
| 2018/0140137 A1 | 5/2018 | Barnard et al. |
| 2019/0000275 A1 | 1/2019 | Sapire |
| 2019/0117013 A1 | 4/2019 | Kim |
| 2019/0142221 A1 | 5/2019 | Miller et al. |
| 2020/0078749 A1 | 3/2020 | Yuan et al. |
| 2020/0113388 A1 | 4/2020 | Sapire |
| 2020/0281409 A1 | 9/2020 | Bannister et al. |
| 2021/0046437 A1 | 2/2021 | Burroughs et al. |
| 2021/0177210 A1 | 6/2021 | Tu |
| 2021/0302016 A1 | 9/2021 | Pan |
| 2022/0142409 A1 | 5/2022 | Beckstrom et al. |
| 2023/0008111 A1 | 1/2023 | LePori |

FOREIGN PATENT DOCUMENTS

| | | |
|---|---|---|
| CN | 206213931 | 6/2017 |
| CN | 209172094 | 7/2019 |
| DE | 1296607 | 6/1969 |
| EM | DM090153 | 3/2016 |

(56) References Cited

FOREIGN PATENT DOCUMENTS

| | | |
|---|---|---|
| EP | 2394546 A1 | 12/2011 |
| EP | 3578089 | 12/2019 |
| GE | 795-0004 | 12/2018 |
| IL | 62842 | 1/2018 |
| JP | H10-117944 | 5/1985 |
| JP | S60194964 | 12/1985 |
| JP | H02-116324 | 5/1990 |
| JP | H02-195921 | 8/1990 |
| JP | 2014-136046 | 7/2014 |
| KR | 300867691.0000 | 8/2016 |
| KR | 20200103227 A | 9/2020 |
| TW | 177516-0001 | 8/2016 |
| WO | 2018085369 A1 | 5/2018 |

OTHER PUBLICATIONS

Notice of Allowance mailed Jul. 29, 2022, for related JP Application No. 2021-008608, 2 pgs.

Notice of Reasons for Rejection mailed Jul. 12, 2022, for related JP Application No. 2021-101776, 7 pgs.

AxPower Extractor Blade, posted at Amazon.com on Sep. 21, 2019, [site visited Jul. 23, 2022]. Available from internet, URL: <https://www.amazon.com/AxPower-Extractor-Blades-Replacement-Bottom-Blender/dp/B07Y682 RVH/> (Year: 2019).

9Lucky Tech Blender Replacement Nutri Ninja, posted at Amazon.com on Jan. 12, 2020, [site visited Jul. 23, 2022]. Available from internet, URL: <https://www.amazon.com/dp/B083RS4JSK/> (Year: 2020).

Feilifan Blender Blade for Ninja Blender, posted at Amazon.com on Aug. 27, 2020, [site visited Jul. 23, 2022]. Available from internet, URL: <https://www.amazon.com/dp/B09WCN91 N1/> (Year: 2020).

* cited by examiner

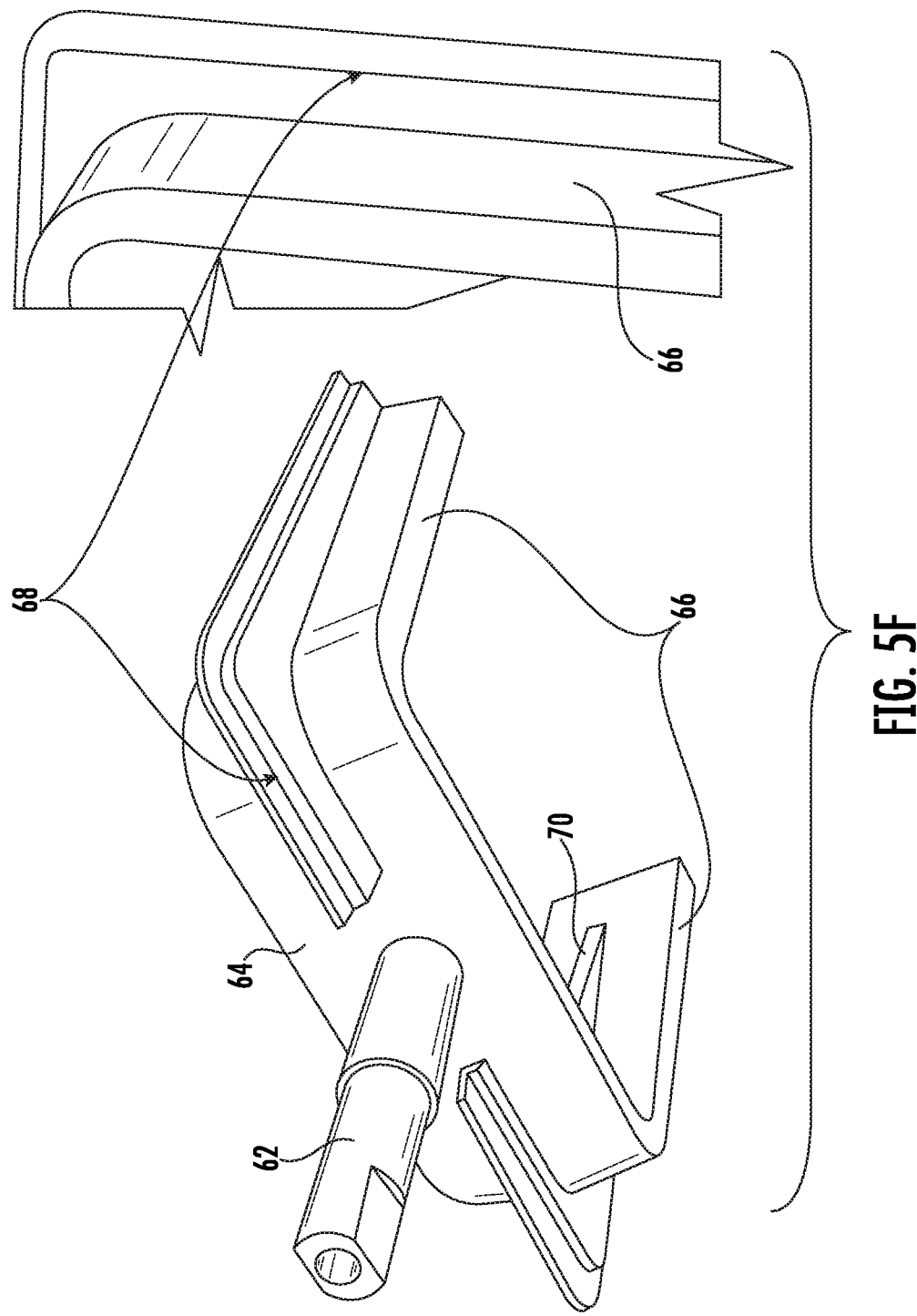

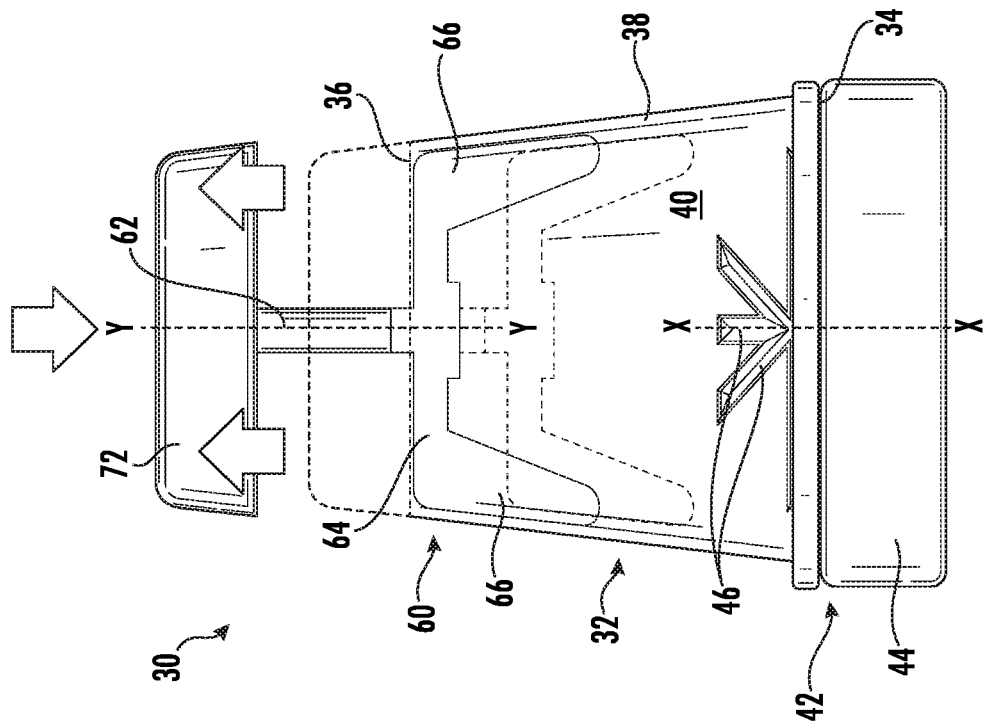
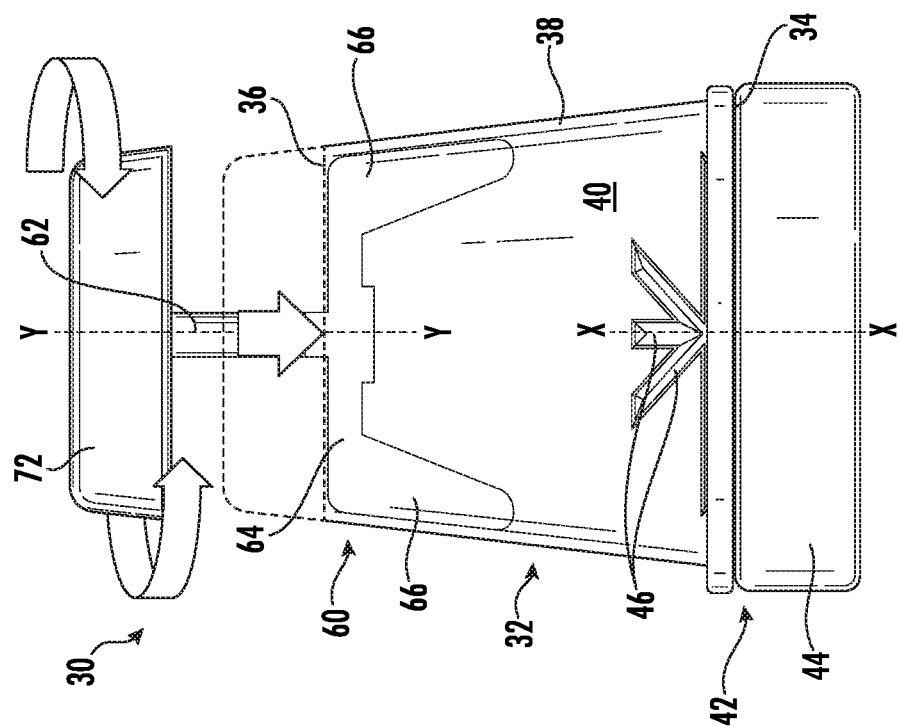
FIG. 10
FIG. 9

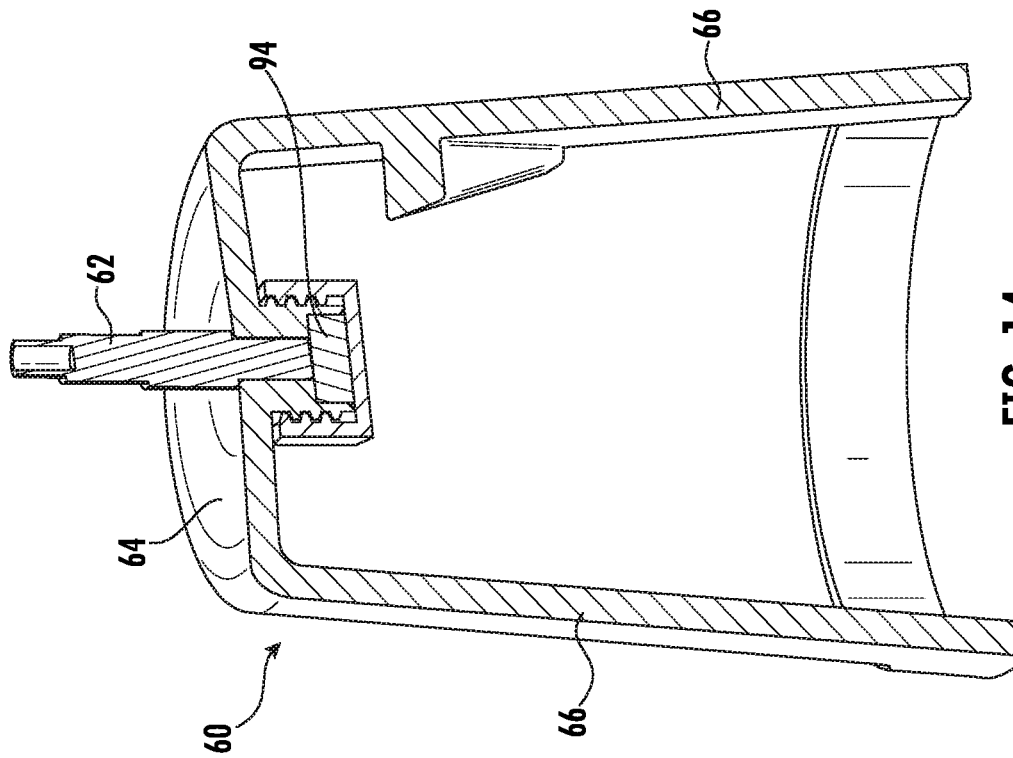
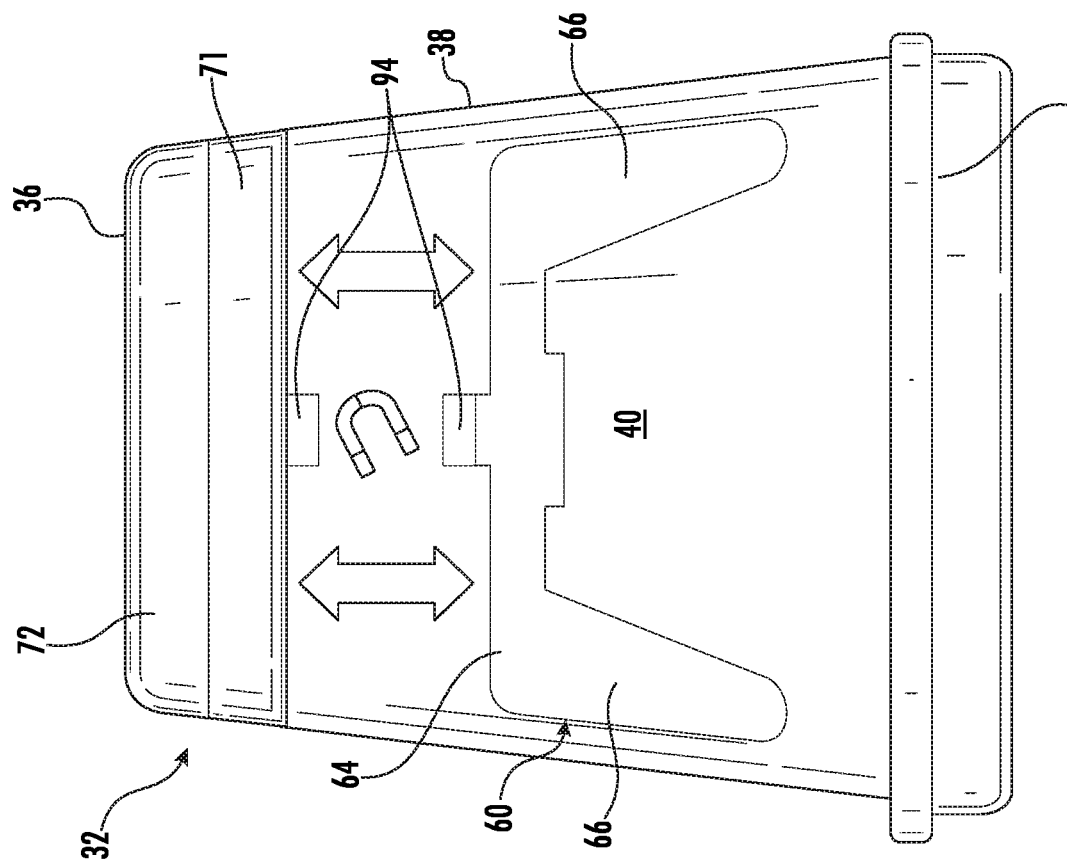

CONTAINER FOR FOOD PROCESSING SYSTEM

CROSS REFERENCE TO RELATED APPLICATION

This application is a continuation of U.S. application Ser. No. 17/179,162 filed Feb. 18, 2021, entitled CONTAINER FOR FOOD PROCESSING SYSTEM, the contents of which are incorporated herein by reference in their entirety for all purposes.

FIELD

Embodiments of the present disclosure relate to a blender, and more particularly to a container of a blender configured to receive one or more food items therein.

BACKGROUND

Blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

When blending thick or frozen ingredients, the ingredients will often stick to the sidewalls of the container, resulting in areas of unprocessed food. This accumulation at the sidewalls of the container, also known as cavitation, occurs because the ingredients are too thick to form a vortex within the container which typically facilitates movement of the ingredients towards a food processing blade during a blending operation.

SUMMARY

According to an embodiment, an attachment for use with a food processing system includes a container body having a sidewall, a first end configured to be mounted to a food processing base, and a second end remote of said first end. The first end is open and the second end is at least partially open. A chamber is defined by said container body and an agitating member is receivable at the first end. A displacement member is arranged at the second end to seal the second end. The displacement member is extendable into the chamber from the second end to increase a pressure within the chamber.

In addition to one or more of the features described above, or as an alternative, in further embodiments comprising a food processing base, wherein during operation of the food processing system, said first end of said container is in an attached arrangement with said food processing base.

In addition to one or more of the features described above, or as an alternative, in further embodiments said second end of said container body includes an end wall oriented transverse to said sidewall, said end wall having an opening formed therein.

In addition to one or more of the features described above, or as an alternative, in further embodiments said displacement member is extendable through said opening.

In addition to one or more of the features described above, or as an alternative, in further embodiments said displacement member is transformable between a first configuration and a second configuration, said displacement member extending into said chamber when in said second configuration.

In addition to one or more of the features described above, or as an alternative, in further embodiments in said first configuration, said displacement member has a convex contour.

In addition to one or more of the features described above, or as an alternative, in further embodiments in said second configuration, said displacement member has a concave contour.

In addition to one or more of the features described above, or as an alternative, in further embodiments a contour of said displacement member in said first configuration is equal and opposite to said contour of said displacement member in said second configuration.

In addition to one or more of the features described above, or as an alternative, in further embodiments said displacement element and said chamber cooperate to define a processing volume.

In addition to one or more of the features described above, or as an alternative, in further embodiments said processing volume when said displacement member is in said first configuration is greater than said processing volume when said displacement member is in said second configuration.

In addition to one or more of the features described above, or as an alternative, in further embodiments when said displacement member is in said first configuration, said processing volume is greater than a volume of said chamber.

In addition to one or more of the features described above, or as an alternative, in further embodiments when said displacement member is in said first configuration, said processing volume is equal to a volume of said chamber.

In addition to one or more of the features described above, or as an alternative, in further embodiments said displacement member is transformable from said first configuration to said second configuration in response to a manual input.

In addition to one or more of the features described above, or as an alternative, in further embodiments said displacement member is transformable from said second configuration to said first configuration in response to rotation of said agitating member.

In addition to one or more of the features described above, or as an alternative, in further embodiments said displacement member is formed from a resilient member.

In addition to one or more of the features described above, or as an alternative, in further embodiments said displacement member is a diaphragm.

According to another embodiment, an attachment for use with a food processing system includes a container body having a sidewall, a first end configured to be mounted to a food processing base, and a second end remote of said first end. The first end is open and the second end is at least partially open. A chamber is defined by said container body and an agitating member is receivable at the first end. A displacement member is arranged at the second end to seal the second end. The displacement member is movable between a first configuration and a second configuration relative to the container body. A processing volume of the attachment when the displacement member is in the second configuration is less than the processing volume of the attachment when the displacement member is in the first configuration.

In addition to one or more of the features described above, or as an alternative, in further embodiments comprising a food processing base, wherein during operation of the food processing system, said first end of said container is in an attached arrangement with said food processing base.

In addition to one or more of the features described above, or as an alternative, in further embodiments in said second configuration, said displacement member extends into said chamber.

In addition to one or more of the features described above, or as an alternative, in further embodiments said displacement element and said chamber cooperate to define said processing volume.

In addition to one or more of the features described above, or as an alternative, in further embodiments when said displacement member is in said first configuration, said processing volume is greater than a volume of said chamber.

In addition to one or more of the features described above, or as an alternative, in further embodiments when said displacement member is in said first configuration, said processing volume is equal to a volume of said chamber.

In addition to one or more of the features described above, or as an alternative, in further embodiments said displacement member is transformable from said first configuration to said second configuration in response to a manual input.

In addition to one or more of the features described above, or as an alternative, in further embodiments said displacement member is transformable from said second configuration to said first configuration in response to rotation of said agitating member.

In addition to one or more of the features described above, or as an alternative, in further embodiments said displacement member is transformed from said first configuration to said second configuration when said agitating assembly is stationary.

In addition to one or more of the features described above, or as an alternative, in further embodiments said displacement member is transformable from said second configuration to said first configuration in response to rotation of said agitating member.

In addition to one or more of the features described above, or as an alternative, in further embodiments said displacement member is formed from a resilient member.

In addition to one or more of the features described above, or as an alternative, in further embodiments said displacement member is a diaphragm.

BRIEF DESCRIPTION OF THE FIGURES

The accompanying drawings incorporated in and forming a part of the specification embodies several aspects of the present invention and, together with the description, serves to explain the principles of the invention. In the drawings:

FIGS. 5A, 5B, 5C, 5D, 5E and 5F are various views of different agitating members suitable for use with the attachment according to an embodiment;

FIG. 9 is a front view of an attachment including a rotatable and translatable manual input device according to an embodiment;

FIG. 10 is a front view of an attachment including a rotatable and translatable manual input device according to another embodiment;

FIG. 13 is a front view of an attachment including an agitating member that is separable from the manual input device and the container according to another embodiment;

FIG. 14 is a detailed cross-sectional view of the interface between the agitating member and the shaft according to an embodiment;

The detailed description explains embodiments of the invention, together with advantages and features, by way of example with reference to the drawings.

DETAILED DESCRIPTION

Figure 1:
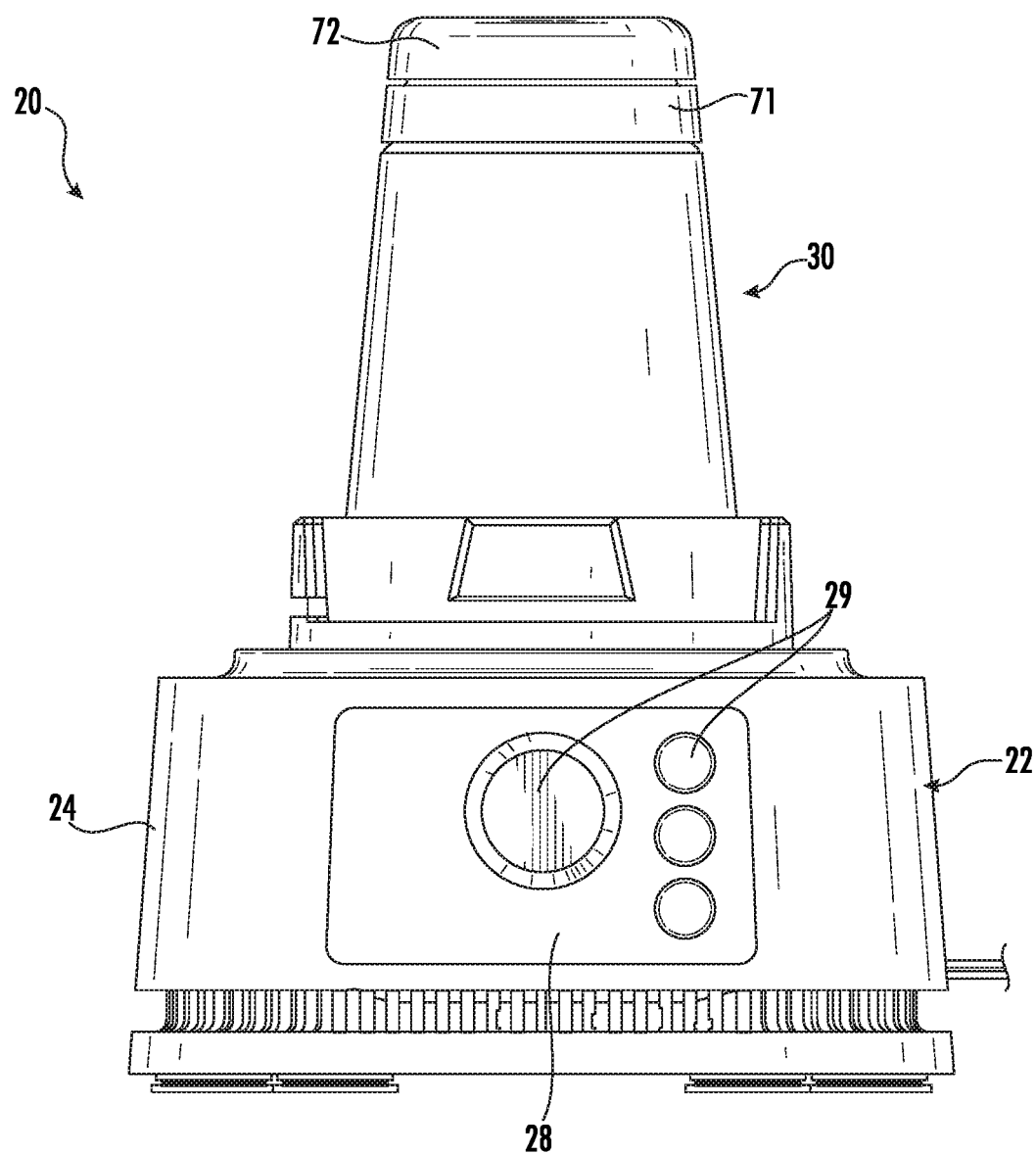
FIG. 1 is a front view of an example of a food processing system.
Figure 2:
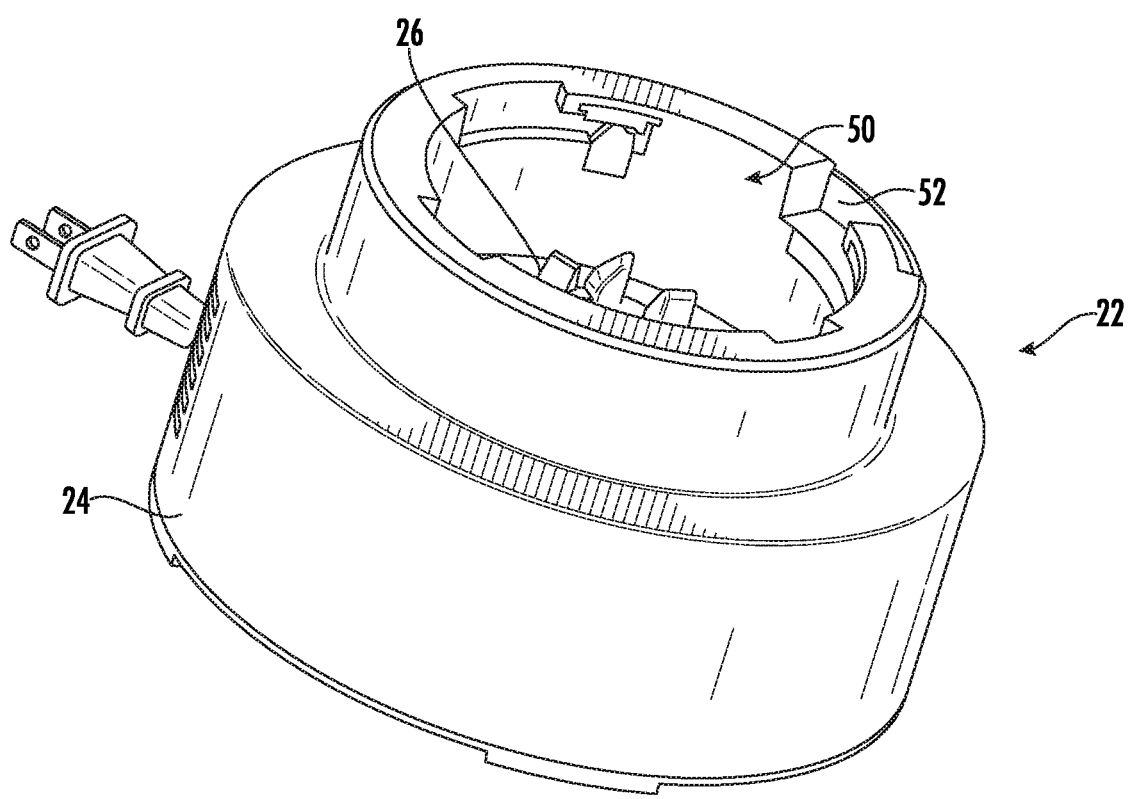
FIG. 2 is a perspective view of an example of a base of the food processing system.

Referring now to FIGS. 1 and 2, an example of a multi-functional food processing system 20 is illustrated. In general, the food processing system 20 can be adapted to perform any food processing or blending operation including as non-limiting examples, dicing, chopping, cutting, slicing, mixing, blending, stirring, crushing, or the like.

Although the food processing system illustrated and described herein is a personal blender system, other food processing systems are within the scope of the present disclosure.

The food processing system 20 includes a food processing base 22 having a body or housing 24 within which a drive unit (not shown) and at least one controller not shown) are located. The drive unit includes at least one rotary component, such as a drive coupler 26 (see FIG. 2) for example, driven by a motorized unit (not shown) located within the housing 24. The food processing base 22 may additionally include a control panel or user interface 28 (best shown in FIG. 1) having one or more inputs 29 for turning the motorized unit on and off and for selecting various modes of operation, such as pulsing, blending, or continuous food processing. However, embodiments where the food processing system 20 does not include a user interface, such as where the food processing system 20 is operable via an application and embodiments where the application of a force to a switch or other component formed in the food processing base 22 (is sufficient to initiate operation of the motorized unit such as in push to operate systems) for example, are also within the scope of the disclosure. The at least one drive coupler 26 is configured to engage a portion of an attachment 30 coupled to the food processing base 22 for the processing of food products located within an interior of the attachment 30. This will become more apparent in subsequent FIGS. and discussion.

Figure 3:
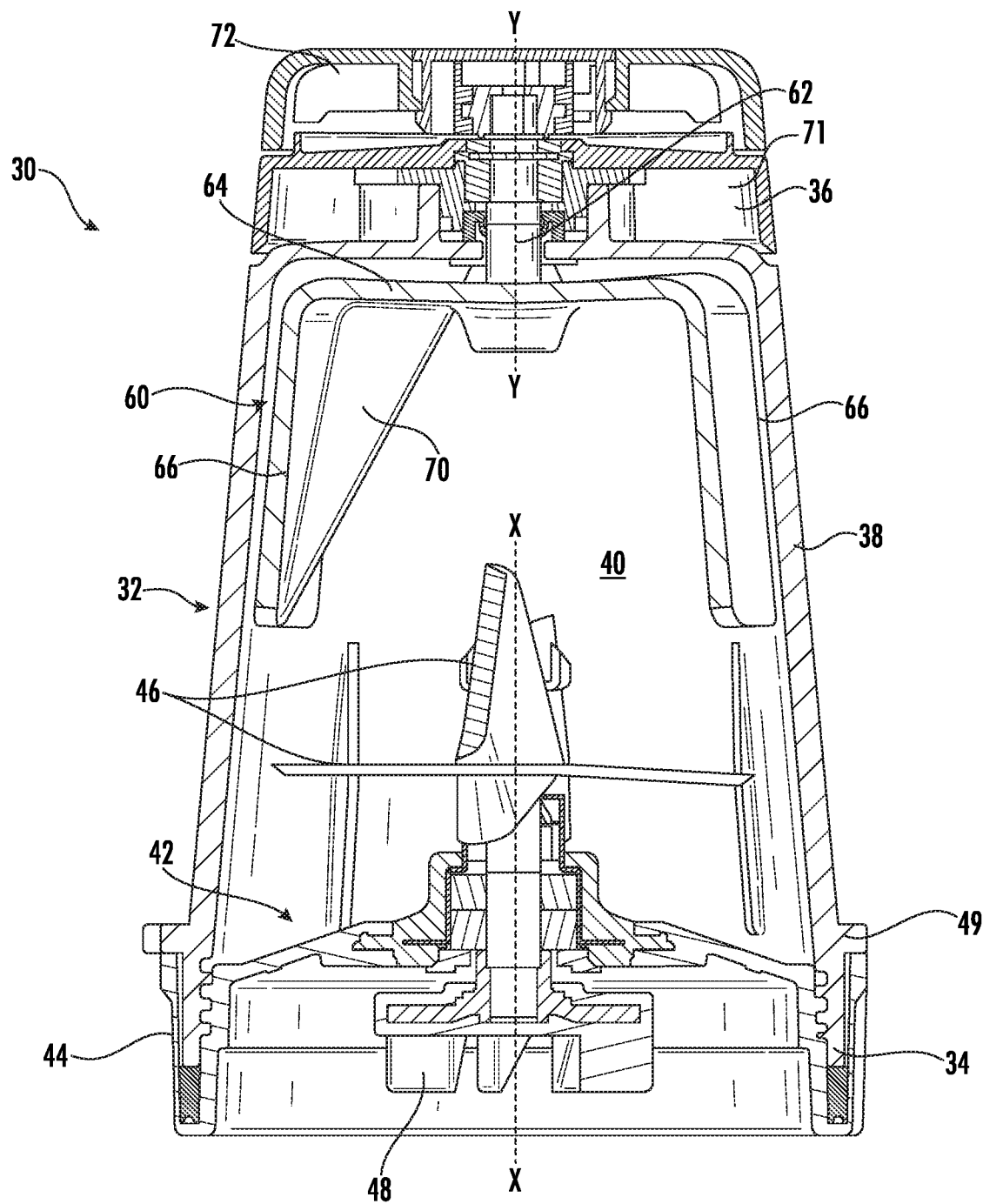
FIG. 3 is a sectioned view of an attachment connectable to the base of the food processing system according to an embodiment.
Figure 4:
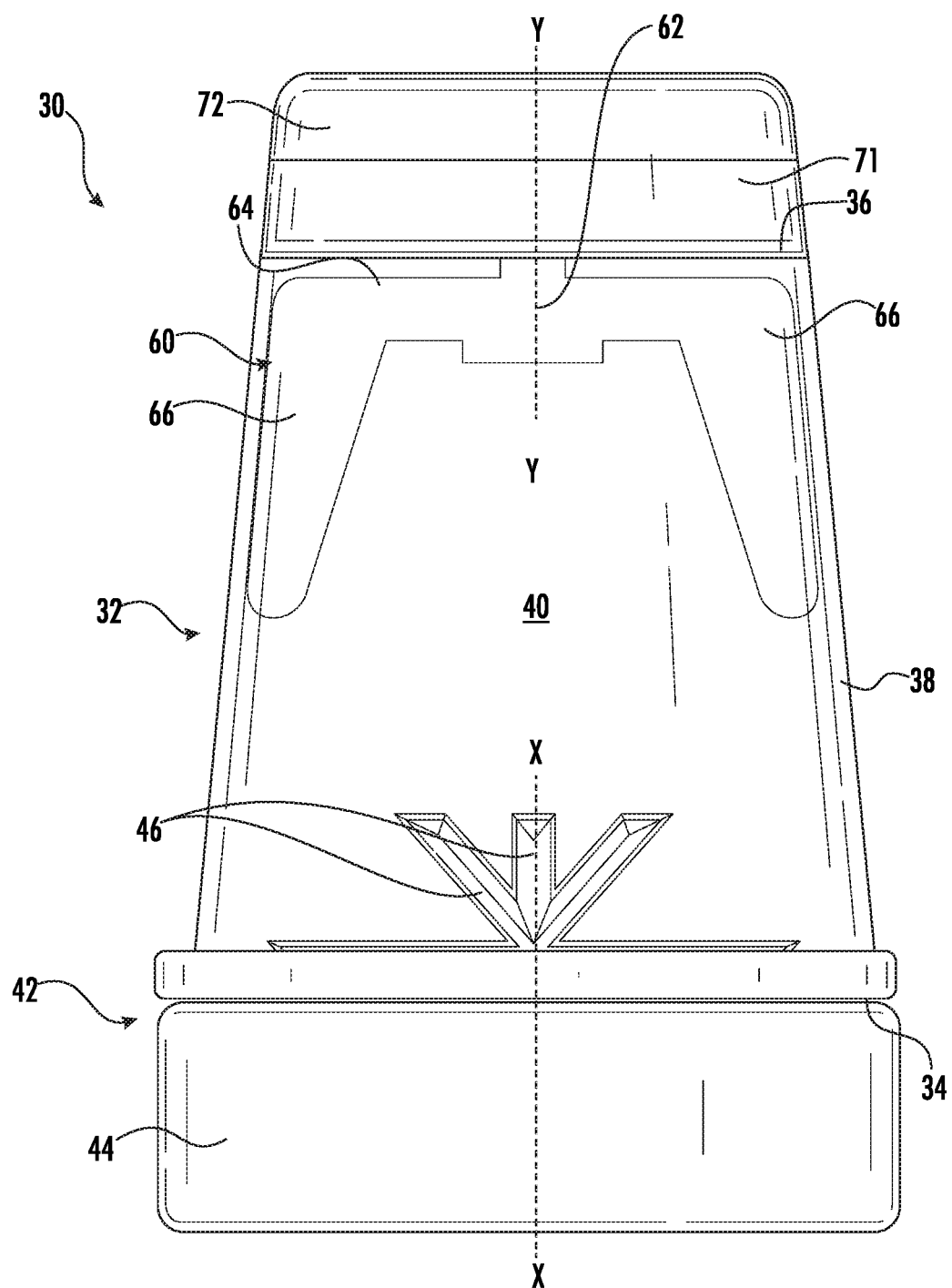
FIG. 4 is a front view of an attachment connectable to the base of the food processing system according to an embodiment.

One or more attachments 30 varying in size and/or functionality may be configured for use with the food processing base 22. An example of an attachment 30 suitable for use with the food processing base 22 is illustrated in FIGS. 3 and 4. As shown, the attachment 30 includes an inverted jar or container 32. The container 32 typically includes a body having a first open end 34, a second closed end 36, and one or more sidewalls 38 extending between the first end 34 and the second end 36. The sidewalls 38 in combination with one or more of the ends 34, 36 of the container 32 define a hollow interior or processing chamber 40 of the container 32. In an embodiment, the container 32 is a "personal blending container" or "cup" that has a first configuration when separated from the food processing base 22 and a second inverted configuration when coupled to the food processing base 22.

In such embodiments, the attachment 30 further includes a first agitating member 42, such as a cutting assembly, configured to removably couple to the first open end 34 of the container 32 to seal the processing chamber 40. In the illustrated, non-limiting embodiment, the cutting assembly 42 includes a body 44 and one or more blades 46 rotatable about an axis X relative to the body 44. When the cutting assembly 42 is connected to the end 34 of the container 32, the first agitating member including the least one blade 46 is disposed within the processing chamber 40 of the container 32. The container 32 and the cutting assembly 42 may be threadably coupled together; however, it should be understood that other mechanisms for removably connecting the container 32 and the cutting assembly 42, such as a bayonet connection or a clip for example, are also contemplated herein.

In each of the various attachment configurations, the cutting assembly 42 is configured to operably couple to the food processing base 22 of the food processing system 20. A driven coupler 48 (see FIG. 3) associated with the cutting assembly 42 is positioned at an exterior of the attachment 30. The at least one drive coupler 26 is configured to engage the driven coupler 48 to rotate the at least one blade 46 about the axis X to process the food products located within the chamber 40 of the container 32. It should be understood that the attachment 30 including an inverted container 32 and a cutting assembly 42 is intended as an example only, and that other attachments, are also contemplated herein.

In embodiments where the attachment 30 includes an inverted container 32, the attachment 30 may include one or more contact members 49 (FIG. 3), such as tabs for example, positioned about the periphery of the attachment 30. It should be understood that an attachment 30 having any number of contact members 49 is within the scope of the disclosure. In embodiments where the attachment 30 includes an inverted container 32 the contact members 49 may extend outwardly from the container 32, the cutting assembly 42, or both.

The contact members 49 of the attachment 30 are configured to cooperate with a mounting area 50 (see FIG. 2) of the food processing base 22 to couple the attachment 30 to the food processing base 22. As shown, the mounting area 50 includes one or more receiving slots 52 within which each of the plurality of contact members 49 of the attachment 30 is receivable. The attachment 30 may be configured to slidably connect to the food processing base 22 of the food processing system 20. Alternatively, or in addition, the attachment 30 may be configured to rotatably connect to the food processing base 22 such that the attachment 30 is locked relative to the food processing base 22. However, it should be understood that any suitable mechanism for coupling the attachment to the food processing base 22 is within the scope of the disclosure.

With continued reference to FIGS. 3 and 4, and further reference to FIGS. reference now to FIGS. 5-16, an attachment 30 of the food processing system 20 suitable for use to process a thick or frozen mixture is described in more detail. As shown, the attachment 30 includes a second agitating member 60 at least partially disposed within the processing chamber 40 of the container 32. As shown, this additional second agitating member 60 includes a shaft 62 extending through the second, sealed end 36 of the container 32. As a result, the second agitating member 60 is arranged opposite the open end 34 of the container 32, and therefore the cutting assembly 42 disposed at the open end 34 of the container 32. The second agitating member 60 is coupled to the shaft 62 such that the shaft 62 drives rotation of the second agitating member 60 about an axis of rotation axis Y. Although the shaft 62 is described herein as being a part of the agitating member 60, in other embodiments, the shaft 62 may be separate from the agitating member 60. Axis Y may but need not be coaxial with axis X of the cutting assembly 42.

Any suitable second agitating member 60 is contemplated herein. In the illustrated, non-limiting embodiments, the second agitating member 60 includes a base 64 mountable about the shaft 62 and having at least one prong or paddle 66 extending at a non-parallel angle from the base 64, such as towards the open end 34 of the container 32. The base 64 and the one or more paddles 66 may be integrally formed as a unitary structure, or alternatively, may be multiple components connected together to form the second agitating member 60. Further, the base 64 and/or the paddles 66 may be integrally formed with the shaft 62, or alternatively, may be removably mounted thereto. Although the second agitating member 60 shown in FIGS. 3 and 4 includes two paddles 66, it should be understood that any suitable number of paddles, such as a single paddle, or alternatively, three, four (see FIGS. 5C and 5E), five, or more paddles 66 are within the scope of the disclosure. Further, the paddles 66 may be spaced equidistantly about the axis of rotation Y or may be staggered based on a desired operation.

Figure 5A:
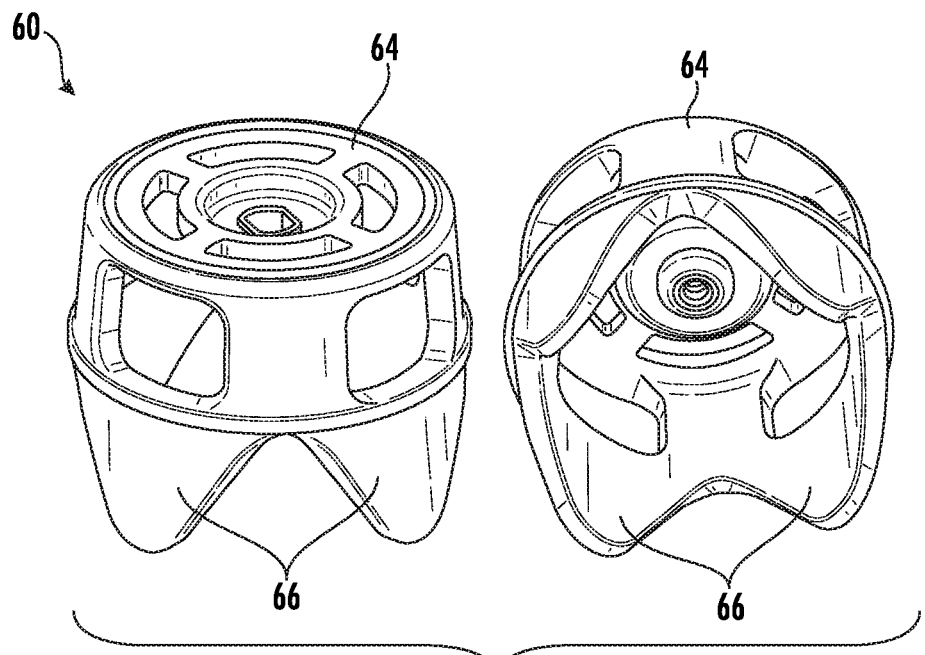
Figure 5B:
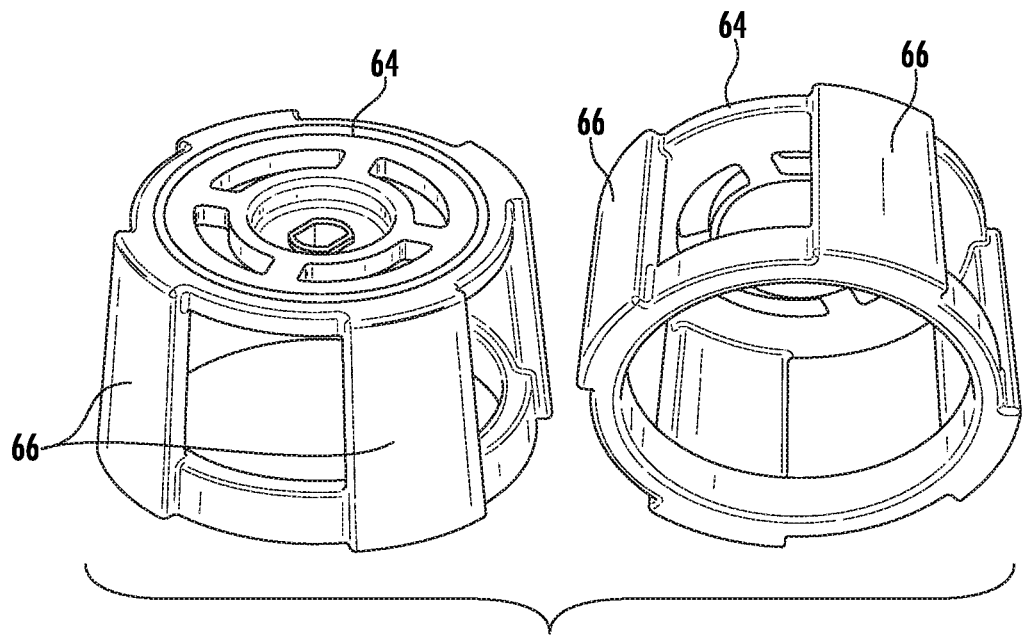
Figure 5E:
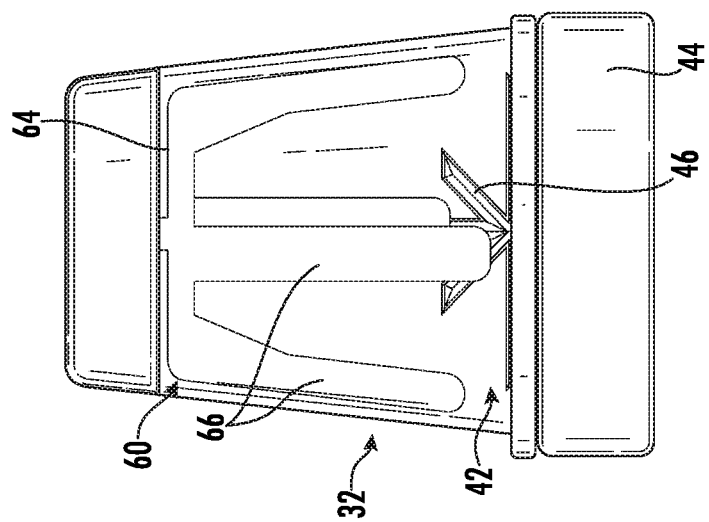
Figure 5D:
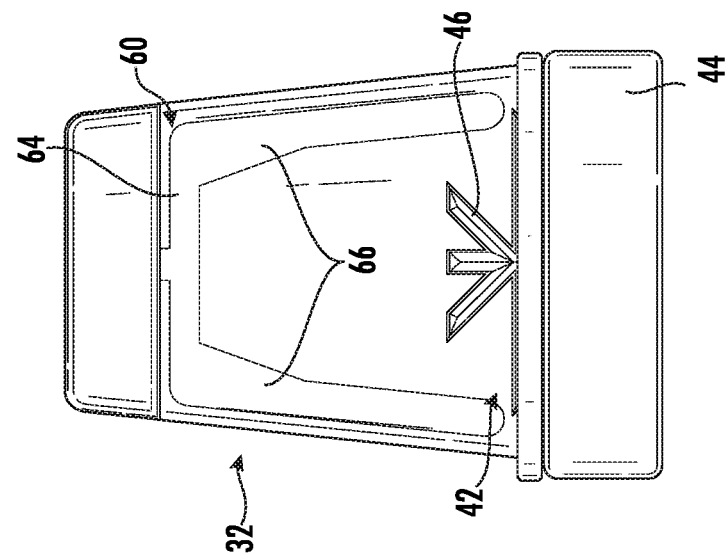
Figure 5C:
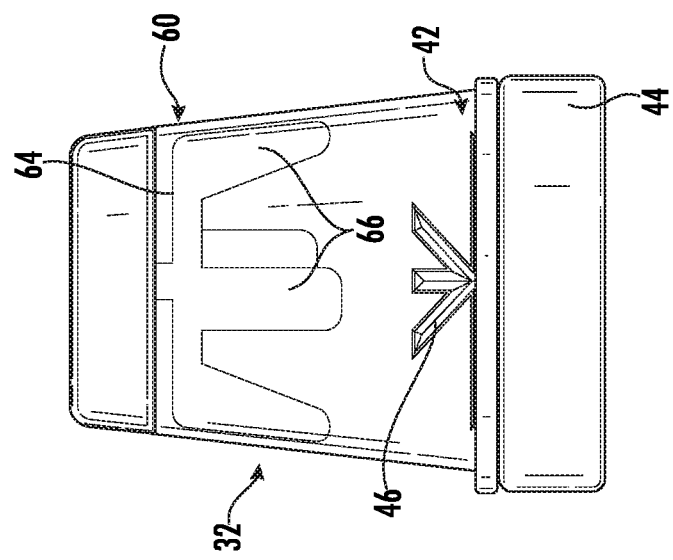

Examples of various configurations of a second agitating member 60 are illustrated in FIGS. 5A-5F. As shown, the paddles 66 of the second agitating member 60 may have any contour or shape and may extend over only a portion of the length of the container 32, or alternatively, over the substantially entire length of the container 32. When a paddle 66 extends over the entire length of the container 32, the distal end of the paddle 66 may be located directly adjacent the body 44 of the cutting assembly 42. In embodiments where one or more of the paddles 66 overlap the at least one blade 46 of the cutting assembly 42, such as in FIGS. 5D and 5E, the paddles 66 may be disposed radially outward of the at least one blade 46 to avoid interference therewith. Further, when the second agitating member 60 has multiple paddles 66, the configuration of the paddles 66 may be substantially identical or may vary. In some embodiments, as shown in FIG. 5B, a portion of the paddles 66 located remotely from the base 64, such as near the distal end of the paddles 66 for example, may be joined together to enhance the stability or rigidity of the paddles 66 as the second agitating member 60 is rotated. However, in other embodiments, the paddles 66 are only connected to one another via the base 64.

A clearance defined between the one or more paddles 66 of the second agitating member 60 and the sidewall 38 of the container 32 may be selected to prevent large food particles from becoming trapped between the second agitating member 60 and the sidewall 38. In an embodiment, at least a portion of one of the paddles 66 has an angle generally complementary to the sidewall 38 of the container 32. As a result, when the second agitating member 60 is positioned within the container 32, the paddle 66 and the sidewall 38 may be parallel to one another, with only a minimal clearance defined there between. Further, by designing one or more of the paddles 66 to match a contour of the adjacent portion of the container 32, the second agitating member 60 may only be insertable into the processing chamber 40 when in a specific orientation. As a result, incorrect installation of the second agitating member 60 may be avoided. However, in other embodiments, at least a portion of one of the paddles 66 may be arranged at a non-parallel angle relative to the interior of the sidewall 38 of the container 32. A non-parallel orientation may be used to eject food and limit or prevent scraping of the interior of the sidewall 38.

In an embodiment, best shown in FIG. 5F, a wiper or scraper 68 extends radially outwardly from one or more surfaces of the second agitating member 60 facing an adjacent surface of the container 32. In the illustrated, non-limiting embodiment, a wiper 68 is arranged at the exterior of each paddle 66. However, embodiments where a wiper 68 is formed at only a single paddle 66, or at the base 64 of the second agitating member 60 are also contemplated herein. Alternatively, or in addition, one or more ribs 70 may extend radially inwardly from the one or more paddles 66 of the second agitating member 60. Although the rib 70 shown in FIG. 3 is connected to the base 64 and extends over the substantially entire height of the paddle 66, embodiments where the rib 70 extends over only a portion of the height of the paddle 66, and embodiments where the rib 70 is located at any position relative to the paddle 66 and does not connect to the base 64 are also within the scope of the disclosure.

To retain the second agitating member 60 at a desired position within the chamber 40, a mounting member 71 may be connected to a portion of the container 32, such as an exterior surface of the second end 36 for example. The mounting member 71 includes a through hole (not shown) configured to receive a portion of the shaft 62. When coupled to the container 32, the mounting member 71 is rigidly affixed to the body of the container 32. Accordingly, the second agitating member 60 is configured to rotate about the axis Y relative to the stationary mounting member 71. The mounting member 71 may be connected to the container body via any suitable means, such as via one or more fasteners for example.

In an embodiment, the second agitating member 60 is manually operated via an input from a user. As shown, a manual input device 72, such as a dial or cap for example, is operably coupled to the second agitating member 60 and/or the shaft 62 about which the second agitating member 60 is mounted. The manual input device 72 is connected to the shaft 62 at a location external to the container 32. In the non-limiting embodiments illustrated in FIGS. 1, 3-4 and 6, the manual input device 72 and the second agitating member 60 are disposed on opposite sides of the mounting member 71. However, in other embodiments, the attachment 30 may not have the mounting member 71 and the manual input device 72 may be located near or directly adjacent to the second sealed end 36 of the container 32. Further, it should be understood that a mounting member 71 may additionally be included in any of the embodiments of the attachments 30 illustrated and described herein.

Figure 6:
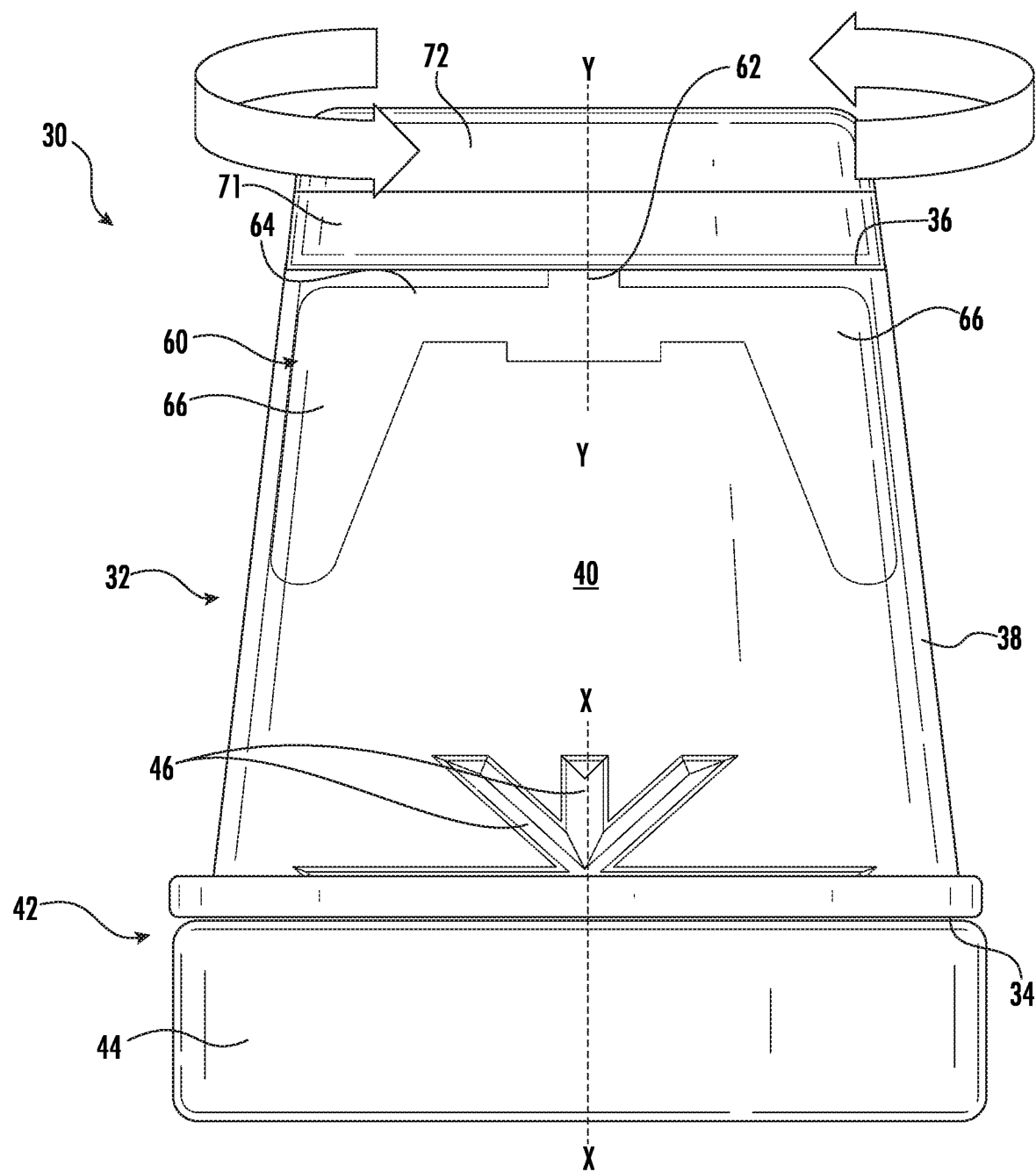
FIG. 6 is a front view of an attachment including a rotatable dial according to an embodiment.

In an embodiment, illustrated in FIG. 6, the manual input device 72 is rotatable in one or more directions to drive rotation of the second agitating member 60 about axis Y to "scrape" or loosen food stuck at the sidewall 38 of the container 32. Alternatively, or in addition, in some embodiments, the manual input device 72 may be operable to translate the second agitating member 60 along the axis Y, such as to push food downwardly towards the cutting assembly 42. In such embodiments, the manual input device 72 may be threadably coupled to the container 32 (see FIG. 9), such that rotation of the manual input device 72 causes the second agitating member 60 to not only rotate but also translate, resulting in movement of the second agitating member 60 along a helical path. In other embodiments, as shown in FIG. 10, the manual input device 72 may be movably mounted to the container 32 using a biasing mechanism (not shown). Accordingly, when a downward force is applied to the manual input device 72, the second agitating member 60 moves downwardly, away from the second end 36 of the container 32, towards the first end 34 of the container 32. When the force is released from the manual input device 72, the biasing force of the biasing mechanism, causes the manual input device 72 and therefore the second agitating member 60 to translate upwardly along the Y axis towards a neutral position, such as adjacent the second end 36 of the container 32.

The manual input device 72 may be directly connected to the second agitating member 60 such that a single turn of the manual input device 72 results in a corresponding single turn of the second agitating member 60. However, embodiments where the manual input device 72 is indirectly coupled to the second agitating member 60, such as via a gearing mechanism, are also within the scope of the disclosure. In such embodiments, a single turn of the manual input device 72 may result in several turns of the second agitating member, or alternatively, less than one turn of the second agitating member 60.

Figure 7:
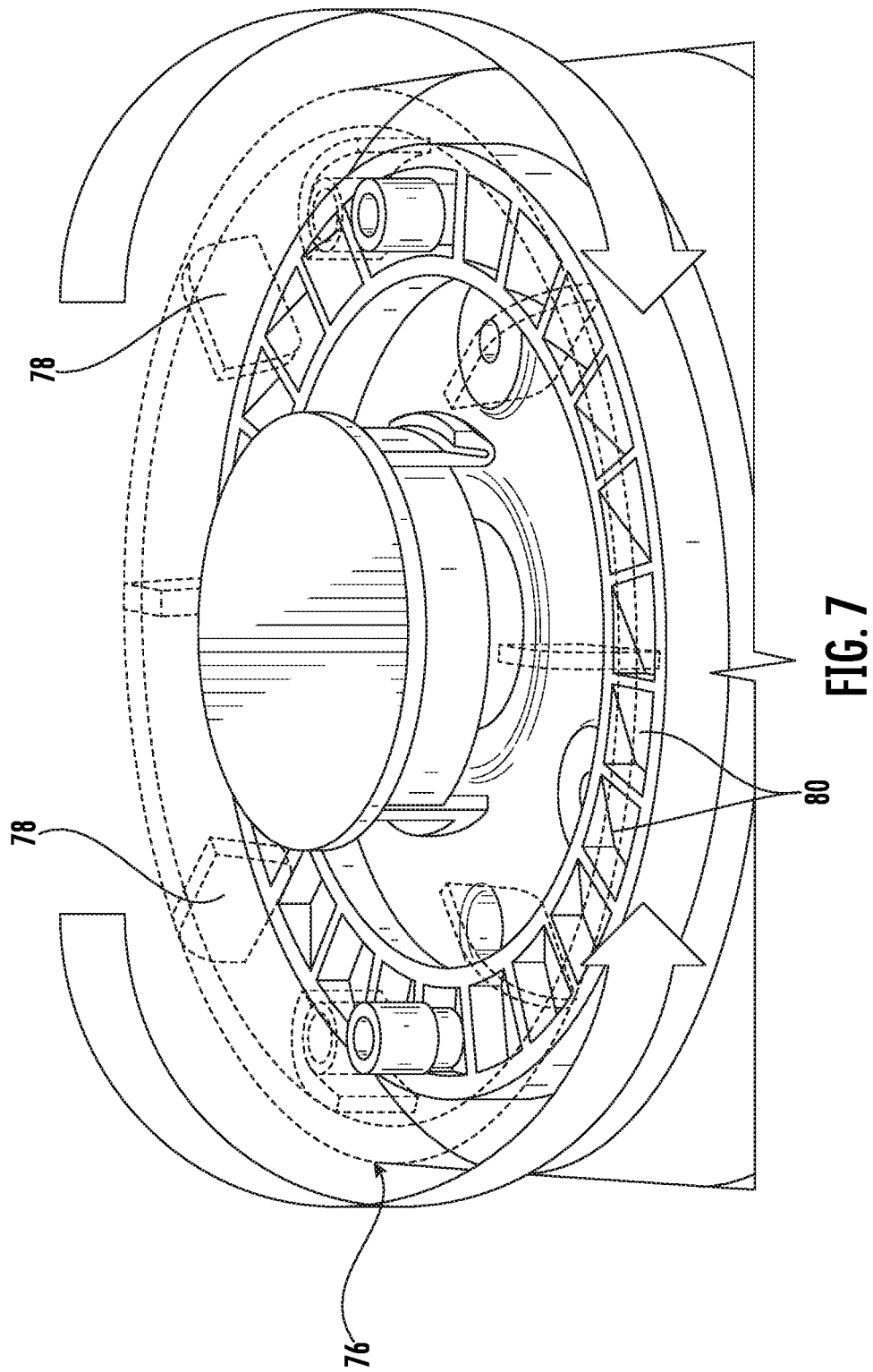
FIG. 7 is a perspective view of a lock associated with the agitating member according to an embodiment.

In an embodiment, the second agitating member 60 does not move during operation of the cutting assembly 42. To prevent undesired movement of the second agitating member 60 relative to the container 32 during operation of the cutting assembly 42, the attachment 30 may further include a lock 76 operably coupled to the second agitating member 60. In an embodiment, the lock 76 includes a ratchet or a one-way clutch device associated with the shaft 62 and/or the manual input device 72. In such embodiments, the ratchet 76 may be a separate device mounted to the second end of the container 32, such as between the container 32 and the manual input device 72, as shown in FIG. 7. Alternatively, the features of the ratchet 76 may be integrally formed into the second end 36 of the container 32 (see FIGS. 8A and 8B). As shown in FIG. 7, the one or more ratchet teeth 78 extend from the manual input device 72 for engagement with the grooves 80 of the ratchet 76 mounted at the second end of the container 32. As a result of the configuration of the grooves 80 and the teeth 78, the ratchet 76 restricts rotation of the manual input device 72, shaft 62, and second agitating member 60 in a first direction about the axis Y. In such embodiments, during operation, the cutting assembly 42 may be configured to rotate about axis X in the direction of restricted rotation of the second agitating member 60 about axis Y. Further, when the manual input device 72 is rotated in the second, allowable direction about the axis Y, the engagement of the teeth 78 with each groove 80 in the ratchet 76 will provide a haptic or tactile feedback to a user. In an embodiment, a pad (not shown) formed from an elastic material, such as silicone for example, may be included adjacent the interface between the teeth 78 and the grooves 80 to soften or limit the noise and/or vibration of the haptic feedback provided to a user.

Figure 8B:
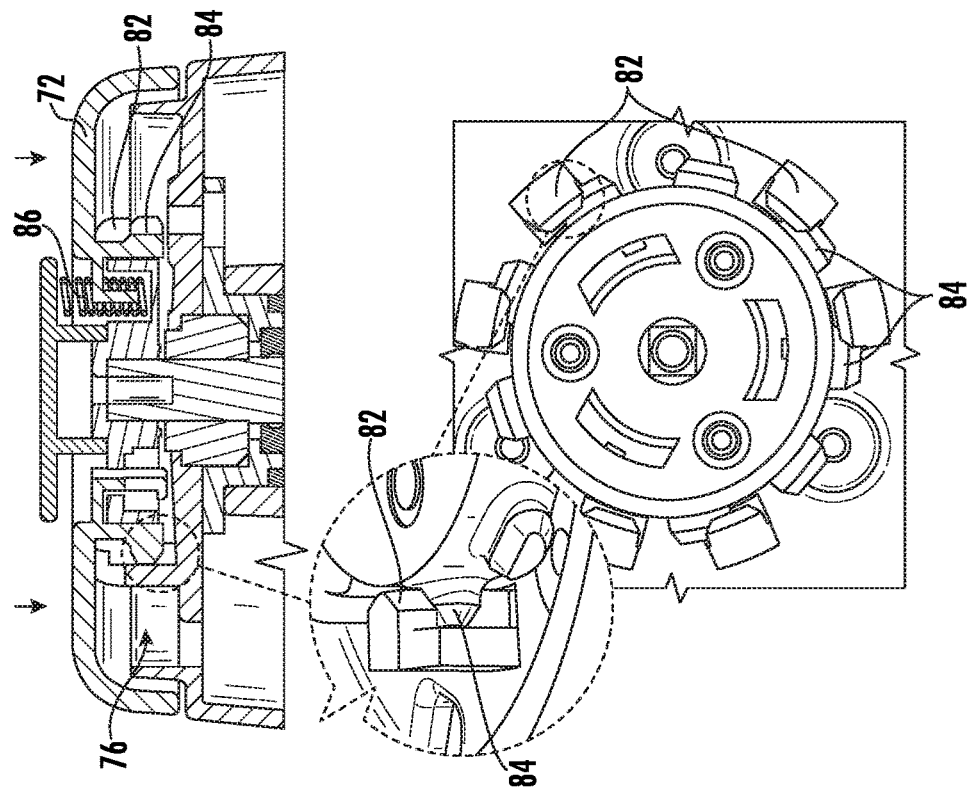
FIG. 8B includes various views of a lock associated with the agitating member in a retracted position according to an embodiment.
Figure 8A:
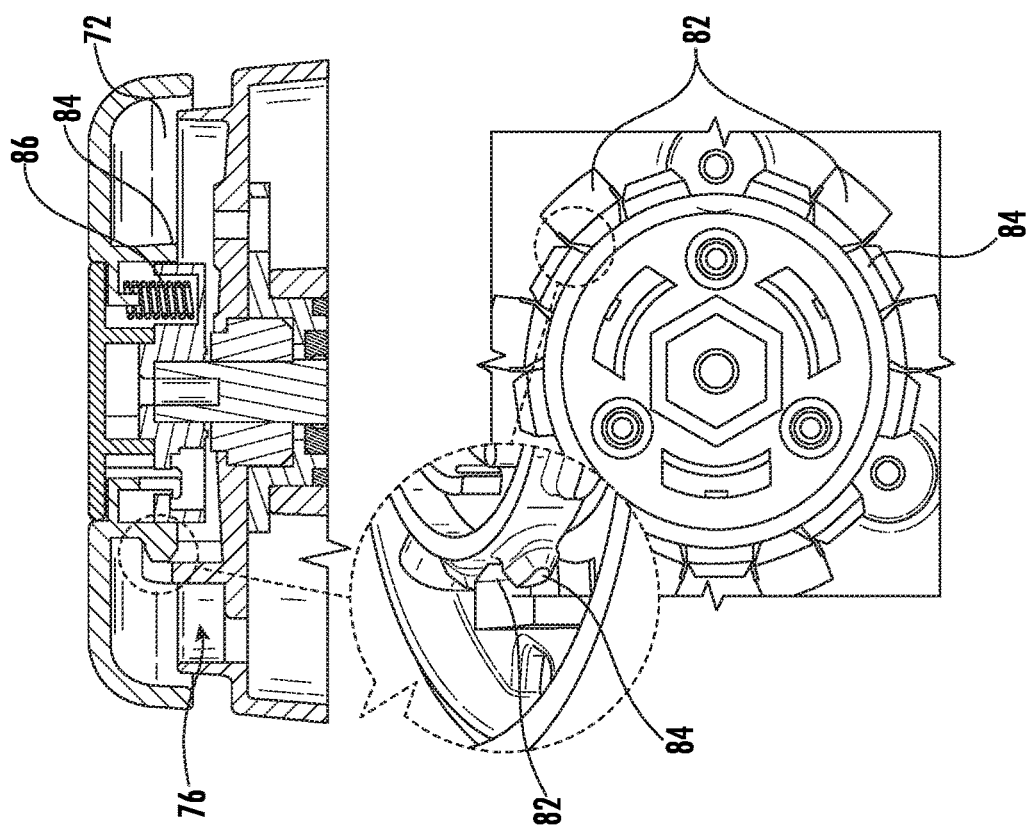
FIG. 8A includes various views of a lock associated with the agitating member in a neutral or extended position according to an embodiment.

In another embodiment, illustrated in FIGS. 8A and 8B, the lock 76 includes a plurality of first teeth 82 extending from the second end 36 of the container 32. The manual input device 72 similarly includes a plurality of second teeth 84 positionable between the plurality of first teeth 82, as shown in FIG. 7A. The manual input device 72 is further mounted with a biasing mechanism 86 such that the manual input device 72 is movable vertically relative to the plurality of first teeth 82. The biasing force of the biasing mechanism 86 positions the manual input device 72 in a first neutral, extended position where the plurality of second teeth 84 are interposed with the plurality of first teeth 82. As a result, rotation of the manual input device 72 about the axis Y when in the extended position is restricted. However, when a downward force is applied to the manual input device 72, the force opposes the bias of the biasing mechanism 86 and the plurality of second teeth 84 move out of the plane of the plurality of first teeth 82. When the manual input device 72 is in this second, depressed position (FIG. 8B), the manual input device 72 is rotatable about the axis Y in at least one direction, and in some embodiments, in two directions. Once the force is removed from the manual input device 72, the biasing force of the biasing mechanism 86 will cause the manual input device 72 to return to the extended position, where rotation of the manual input device 72 is restricted.

Figure 11:
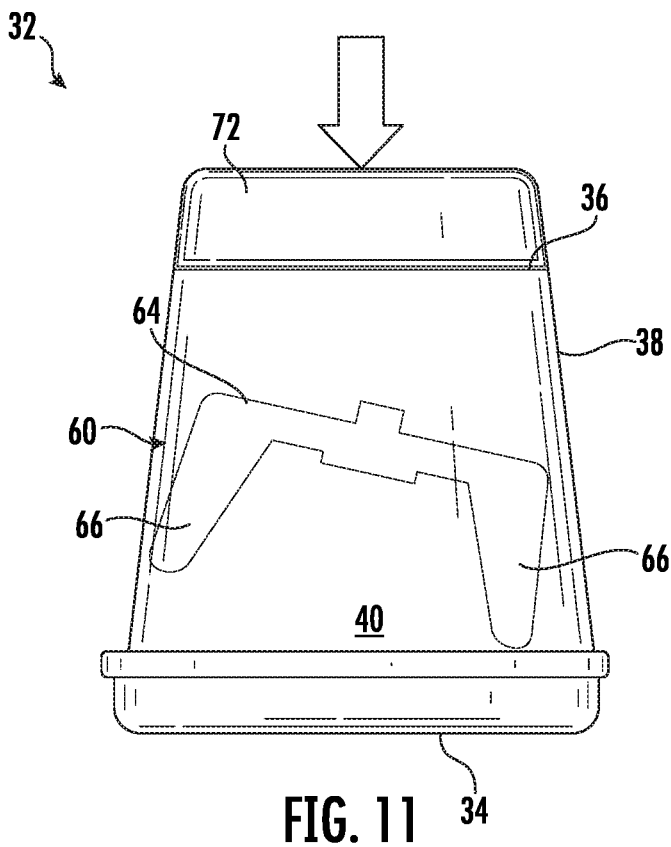
FIG. 11 is a front view of an attachment including an agitating member that is separable from the manual input device and the container according to another embodiment.
Figure 12:
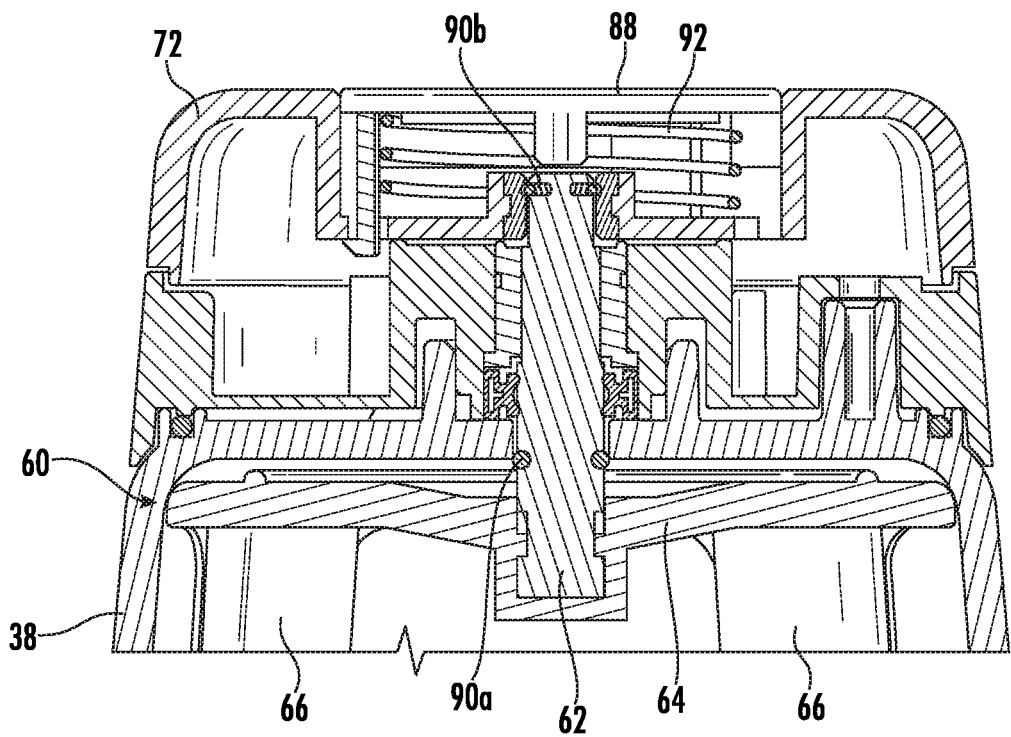
FIG. 12 is a detailed cross-sectional view of the interface between the agitating member and the manual input device according to an embodiment.
Figure 16:
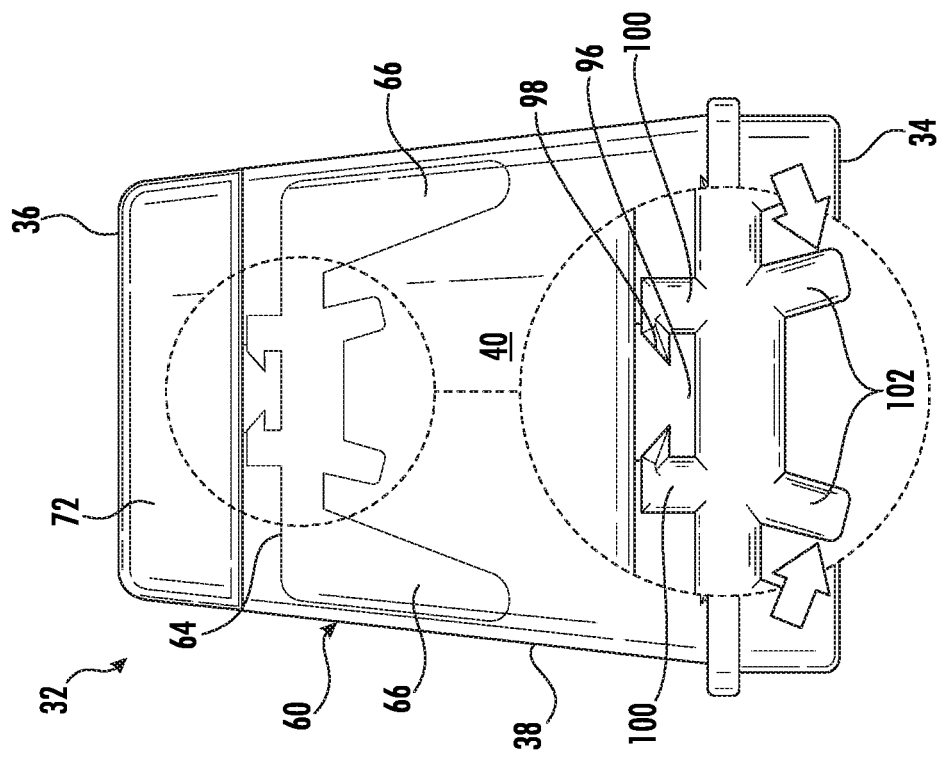
FIG. 16 is a front view of an attachment including an agitating member that is separable from the manual input device and the container according to another embodiment.

The second agitating member 60 may be permanently affixed to the container 32. However, in an embodiment, the second agitating member 60 is separable from the container 32, the mounting member 71, and/or the manual input device 72, such as to facilitate cleaning thereof. With reference now to FIGS. 11 and 12, the manual input device 72 may include a push button 88 operable to selectively decouple the second agitating member 60 therefrom. In such embodiments, the shaft 62 may have at least one spring biased detent formed therein. As shown, a first detent 90a may be arranged at the interface between the shaft 62 and the container 32. Alternatively, or in addition, a second detent 90b may be arranged at the interface between the shaft 62 and the manual input device 72. In the extended positions, the detents 90a, 90b engage a groove or other feature formed in the adjacent component to restrict movement of the shaft 62 relative to the container 32, or the manual input device 72 relative to the shaft 62/container 32, respectively. Application of a force to a push button 88 formed in the manual input device 72 causes the first and second detent 90a, 90b to retract radially inwardly into the shaft 62, thereby separating the detent 90a, 90b from the groove or feature formed in the adjacent components. As a result, in this retracted position, the shaft 62 can be translated relative to the container 32. This allows the second agitating member 60 and the shaft 62 to be separated from the container 32, and in some embodiments, the manual input device 72 to be separated from the second agitating member 60 and even the mounting member 71 and the container 32. When the force is released from the push button 88, a biasing mechanism 92 coupled to the push button 88 causes the push button 88 to return to its original position and the detents 90a, 90b to return to the extended position.

With reference to FIGS. 13 and 14, in another embodiment, the second agitating member 60 and/or shaft 62 may be retained within the processing chamber 40 via a magnetic connection or coupling. As shown, a magnet 94 may be mounted within the base 64 of the second agitating member 60, such as for connection to an end of the metal shaft 62 (FIG. 14). Accordingly, application of a force to the second agitating member 60 that exceeds the magnetic force coupling the second agitating member 60 to the shaft 62 will be sufficient to separate the second agitating member 60 from the shaft 62. Although the magnetic connection is described as being between the second agitating member 60 and the metal shaft 62, it should be understood that the magnetic connection may be formed with another magnet, such as shown in FIG. 13. Further, embodiments where the magnetic connection is formed at another location, such as between the shaft 62 and a portion of the manual input device 72 or at an intermediate portion of the shaft 62 for example, are also within the scope of the disclosure.

Figure 15:
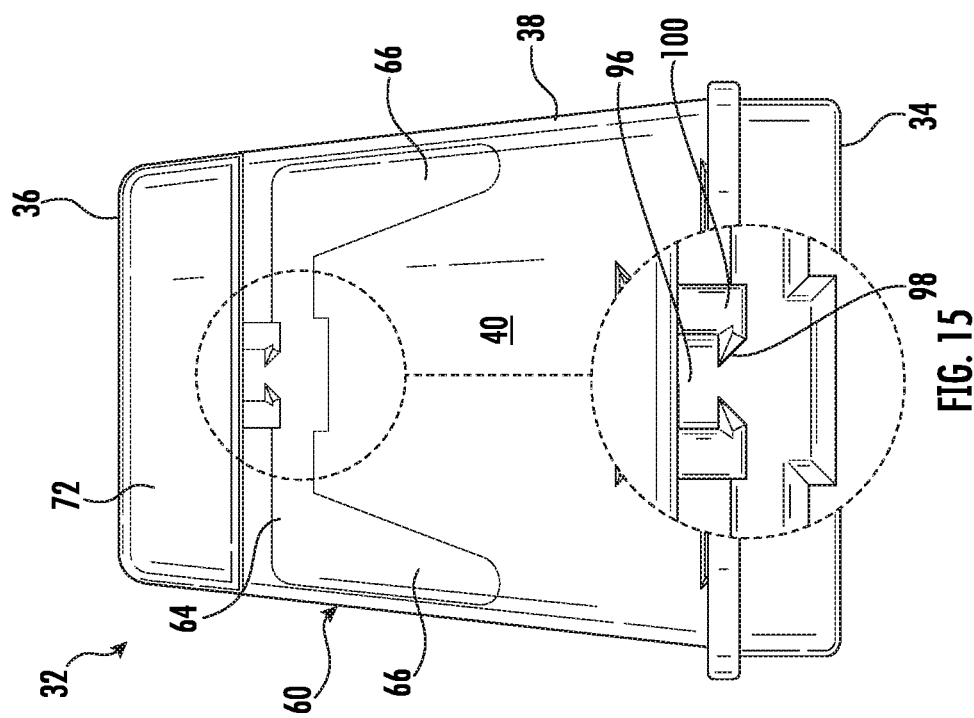
FIG. 15 is a front view of an attachment including an agitating member that is separable from the manual input device and the container according to another embodiment.

In yet another embodiment, the processing assembly may be removably connected to the manual input device 72 via a snap fit or spring clip type of connection. As shown in FIG. 15, in an embodiment, a feature 96 defining one or more grooves 98 may extend from a portion of the second agitating member 60, such as the base 64 for example, for connection to a plurality of resilient members 100. As the feature 96 is moved towards the clearance, the engagement with the resilient members causes the members to flex outwardly, to receive the feature therein. Once the feature 96 reaches a specific position, the bias of the resilient members 100 will cause them to engage the grooves 98 of the feature 96. The engagement between the grooves 98 and the resilient members 100 prevents separation of the second agitating member 60 from the manual input device 72.

To separate the second agitating member 60 from the resilient members 100, a force applied to the second agitating member 60 must be sufficient to push the resilient members 100 outwardly, out of engagement with grooves 98. In another embodiment, shown in FIG. 16, the resilient members 100 may extend from a first side of the second agitating member 60 and the grooves 98 may be formed in feature 96 extending from the manual input device 72, or alternatively formed in the shaft 62. One or more release levers 102 operably coupled to the resilient members 100 may extend from a second, opposite side of the second agitating member 60. When the distal or free end of the release levers 102 are squeezed together, the resilient members 100 flex outwardly, to decouple from the grooves 98, thereby allowing the second agitating member 60 to separate from the dial. When the force is removed from the release levers 102, the resiliency of the material causes the resilient members 100 to bias back to a neutral position. It should be understood that the mechanisms and configurations for removably coupling the second agitating member 60 to the shaft 62 and/or manual input device 72 are provided as examples only and any suitable coupling mechanism for removably mounting the processing assembly within the processing chamber 40 is within the scope of the disclosure.

Figure 17:
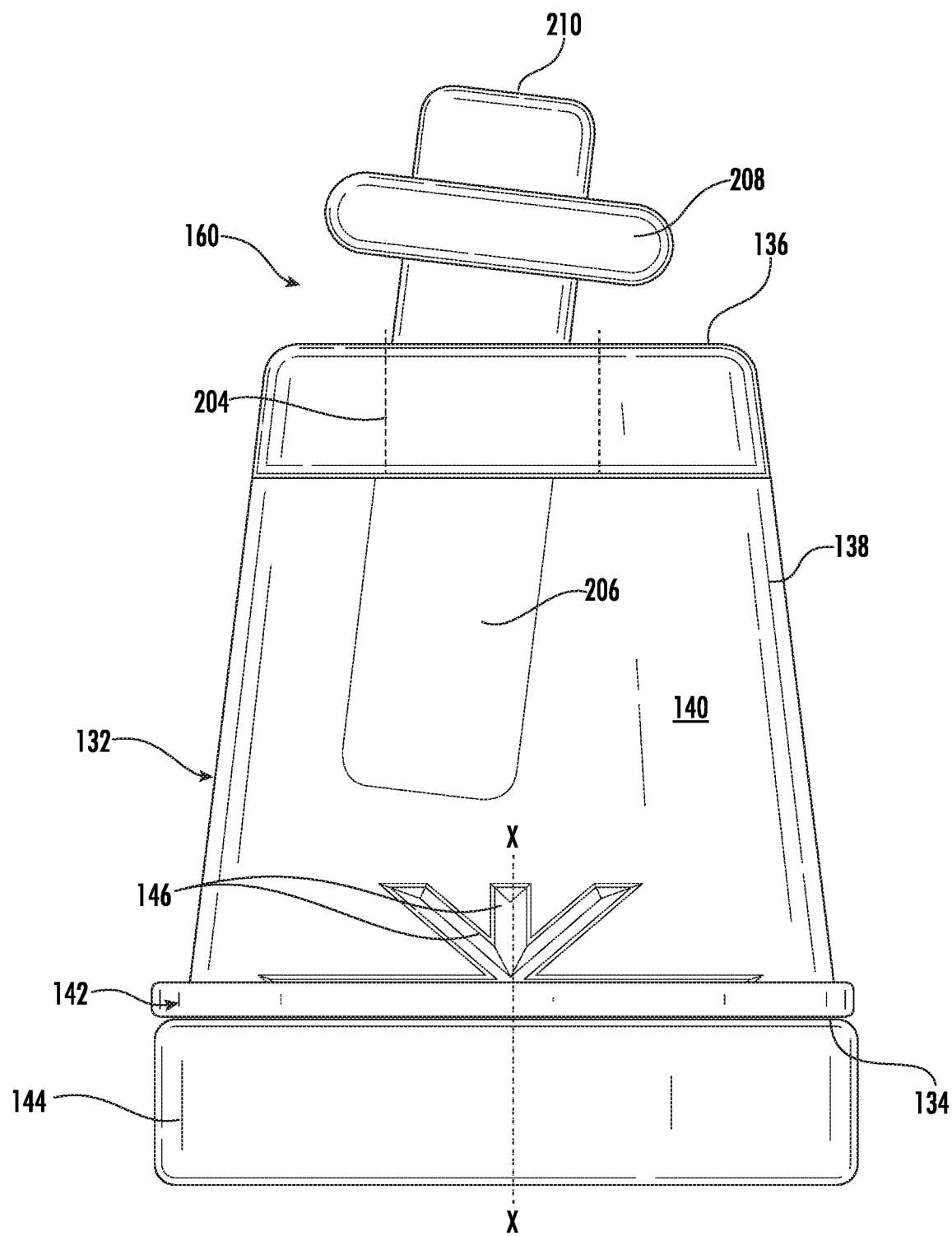
FIG. 17 is a front view of an attachment including an agitating member according to an embodiment.
Figure 17A:
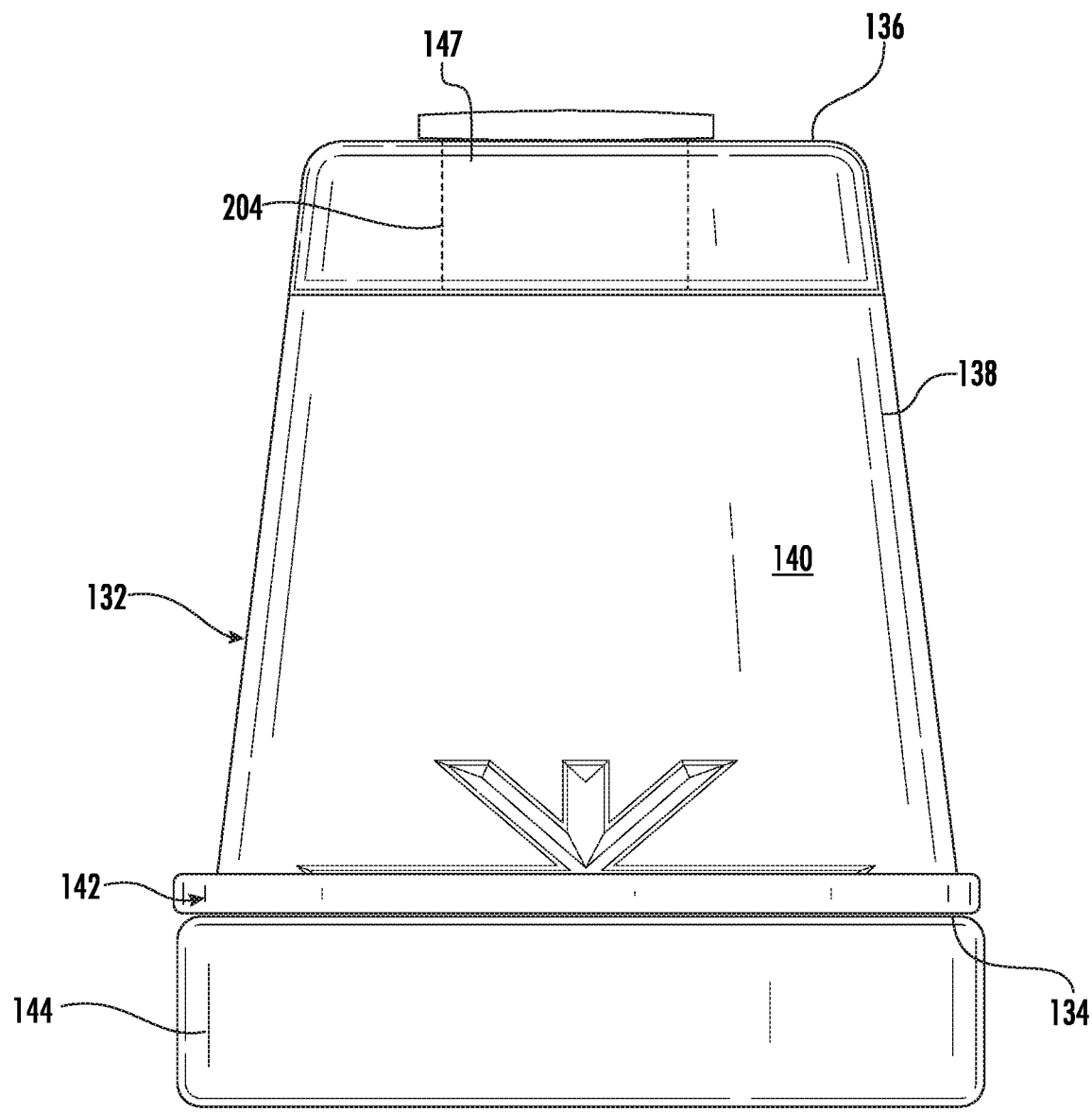
FIG. 17A is a front view of an attachment including a cap member according to an embodiment.

With reference now to FIGS. 17 and 17A, another embodiment of an attachment 130 suitable for use with the food processing base is illustrated. As shown, the attachment 130 similarly includes an inverted jar or container 132 having a first open end 134, a second generally closed end 136, and one or more sidewalls 138 extending between the first end 134 and the second end 136 to define a hollow interior or processing chamber 140 of the container 132. The attachment 130 further includes a first agitating member 142, such as a cutting assembly for example, configured to removably couple to the first open end 134 of the container 132 to seal the processing chamber 140. The attachment 130 may further include a second agitating member 160 selectively positionable within the chamber 140. In the illustrated, non-limiting embodiment, a removable seal or cap member 147 (see FIG. 17A) is positionable within an opening, illustrated schematically via broken lines at 204, formed at the second end 136 of the container 132, and the second agitating member 160 is a tamper that is insertable into the chamber 140 via the opening 204. Accordingly, a user may remove the cap member 147 and insert the tamper 160 through the opening 204 in the second end 136. A user may then manually manipulate the tamper 160 to push unprocessed food or food stuck at the sidewall of the container towards the cutting assembly 142. When a user is finished using the tamper 160, the cap member 147 may be reinserted into the opening 204 to seal the second end 136 of the container 132. It should be understood that the first agitating member 142 may be operated when either the tamper 160 or the cap member 147 is inserted within the opening 204.

As shown, the tamper 160 has a generally cylindrical body 206 having a diameter smaller than the diameter of the opening 204; however, it should be understood that a body 206 having any cross-sectional shape is within the scope of the disclosure. A radially outwardly extending flange 208 is connected to the cylindrical body 206 adjacent a first end 210 thereof. The diameter of the flange 208 is greater than the opening 204 to restrict the end 210 of the tamper 160 from falling through the opening 204 into the chamber 140. As a result, in use, a portion of the tamper 160 is positioned within the chamber of the container 132 and a portion of the tamper 160 remains adjacent an exterior of the container 132. In any embodiment including a tamper 160, the cylindrical body 206 of the tamper 160 arranged within the chamber 140 is operable as an agitating member to stir or move the one or more food items arranged within the chamber 140. The agitation performed by movement of the body 206 within the chamber 140 occurs in response to a manual input applied to the end 210 thereof.

Figure 18:
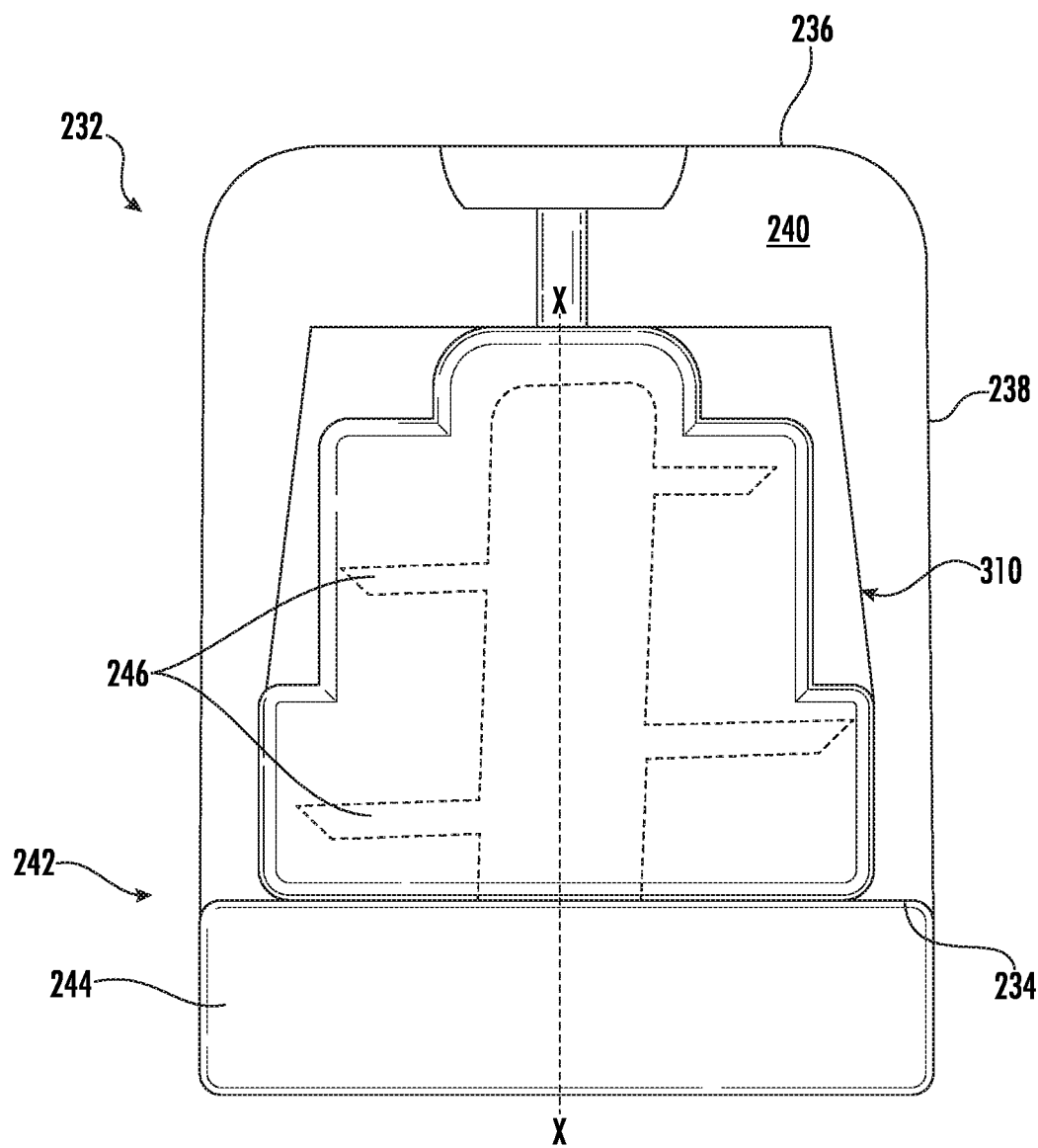
FIG. 18 is a front view of an attachment including an agitating member positioned in overlapping arrangement with the cutting assembly according to another embodiment.
Figure 20:
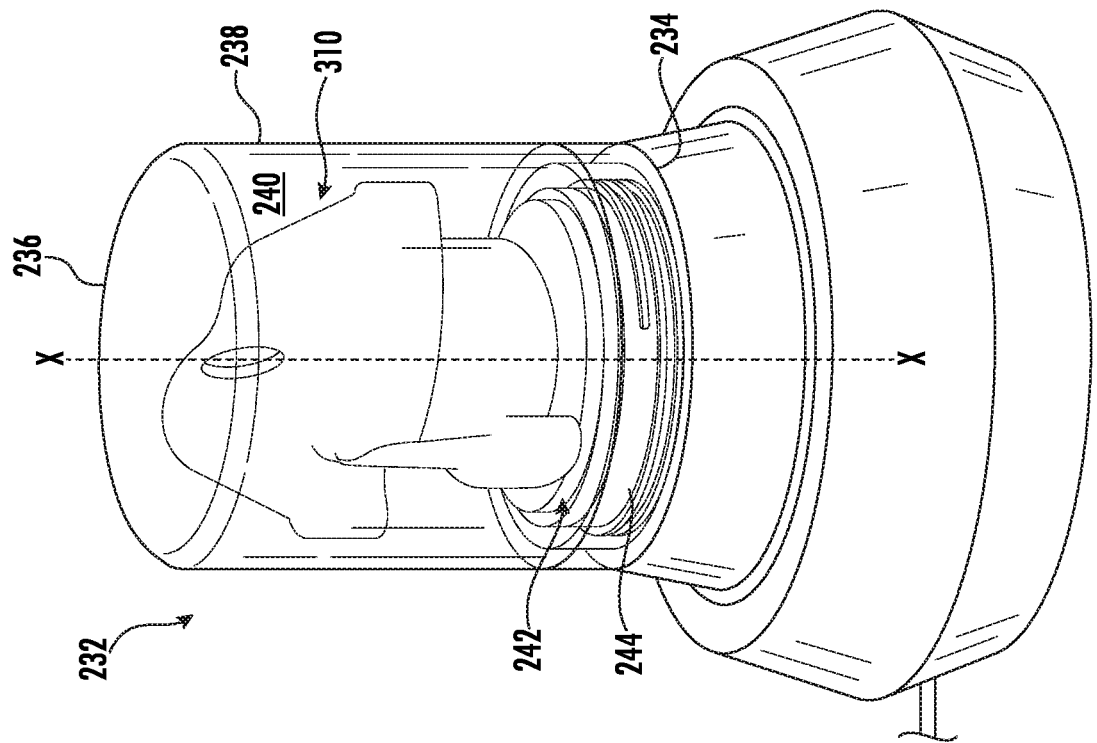
FIG. 20 is a perspective view of a food processing system including an agitating member positioned in overlapping arrangement with the cutting assembly according to another embodiment.
Figure 19:
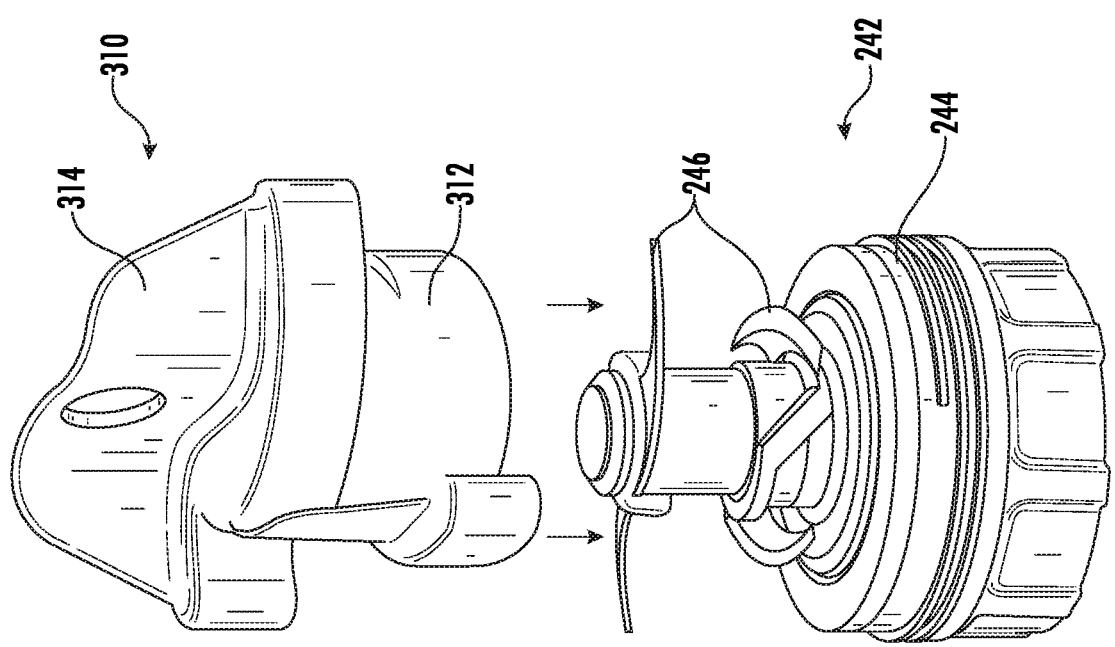
FIG. 19 is an exploded perspective view of an attachment including an agitating member positionable in overlapping arrangement with the cutting assembly according to another embodiment.

With reference now to FIGS. 18-20, another embodiment of an attachment 230 suitable for use with the food processing base is illustrated. As shown, the attachment 230 similarly includes an inverted jar or container 232 having a first open end 234, a second closed end 236, and one or more sidewalls 238 extending between the first end 234 and the second end 236 to define a hollow interior or processing chamber 240 of the container 232. The attachment 230 further includes a first agitating member 242, such as a cutting assembly for example, configured to removably couple to the first open end 234 of the container 232 to seal the processing chamber 240. As previously described, the cutting assembly 242 typically includes a body 244 and one or more blades 246 rotatable about an axis X relative to the body 244. The container 232 may, but need not include a second agitating member 60, 160 positioned within the processing chamber, adjacent the second end 236 of the container 232, as described above.

In the illustrated, non-limiting embodiment, another agitating member 310 is positioned in overlapping arrangement with a portion of the cutting assembly 242. The agitating member 310 includes a body 312 having a generally hollow interior (not shown) within which the one or more blades 246 of the cutting assembly 242 are receivable (see FIG. 19). When the agitating member 310 is installed about the blades 246 of the cutting assembly 242, the body 312 of the agitating member 310 forms a cover or barrier to block the blades 246 from interacting with one or more food items within the chamber 240. Further, when the agitating member 310 is installed about the blades 246 of the cutting assembly 242, the agitating member 310 is rotationally coupled to the blades 246 of the cutting assembly 242. As a result, operation of the cutting assembly 242 drives rotation of the agitating member 310 about the axis X, and this rotation is used to perform a processing operation via the agitating member 310.

A contour of the exterior of the agitating member 310 may be shaped to perform a desired processing operation. In an embodiment, the agitating member 310 is operable to perform a mixing operation rather than a cutting or chopping operation. As best shown in FIGS. 19 and 20, the body 312 of the agitating member 310 may be formed with a plurality of generally arcuate contours. Further, a paddle 314 having a large surface area may extend generally perpendicularly from an end 316 of the body 312, such as towards the second end 236 of the container 232 for example. Rotation of the body 312, and therefore the paddle 314, causes the food items within the chamber to swirl about the axis and mix together. It should be understood that the configuration of the agitating member 310 illustrated and described herein is intended as an example only, and that any suitable configuration is within the scope of the disclosure.

A single-serve or personal blending container including an agitating member 60, 160 or 210 as illustrated and described herein allows for the production of a thick, consistent culinary output, while minimizing excessive cavitation. Further, minimal input is required from a consumer to operate the processing assembly to encourage the flow of ingredients back towards the blades performing the blending operation.

Figure 21:
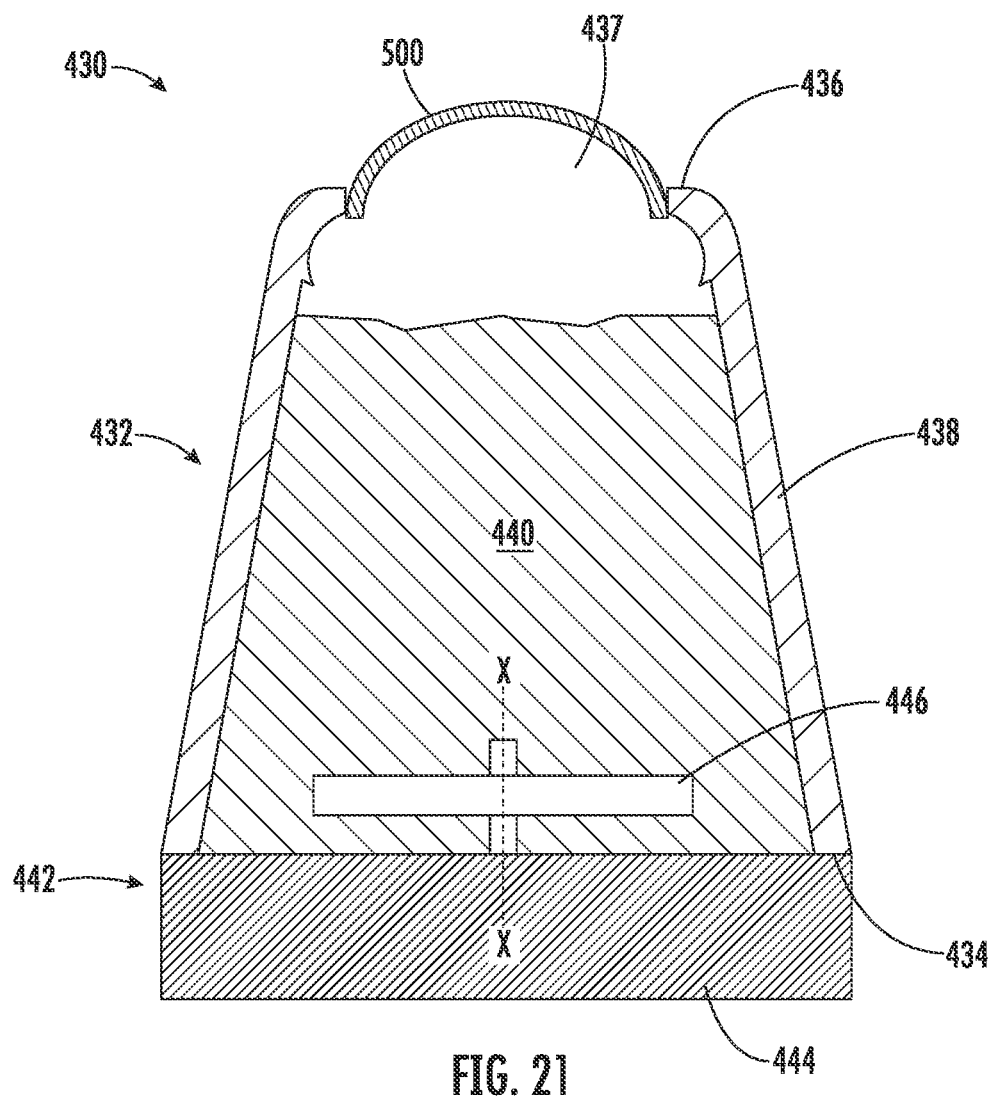
FIG. 21 is a front view of an attachment including a displacement member in a first configuration according to an embodiment.
Figure 22:
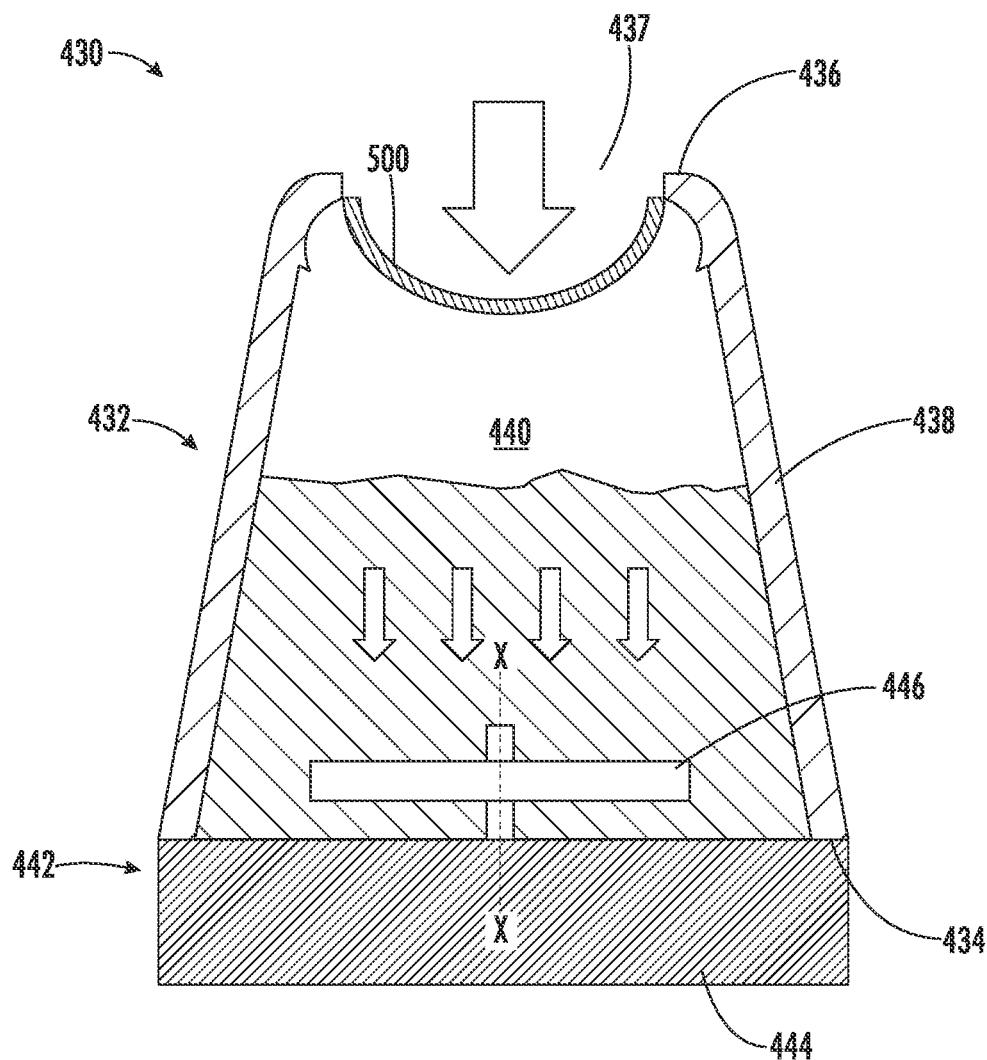
FIG. 22 is a front view of the attachment of FIG. 21 when the displacement member is in a second configuration according to an embodiment.

With reference now to FIGS. 21 and 22, an example of an attachment 430 according to yet another embodiment is illustrated. In the illustrated, non-limiting embodiment, the second end 436 of the container 432 is substantially open, or includes a wall having a generally centrally located opening 437 formed therein. A displacement member 500 is connected to the container 432 in overlapping arrangement with the opening 437, such that the displacement member 500 cooperates with the body of the container 432 to seal the second end 436 thereof. The displacement member 500 may be connected to an exterior surface, or alternatively, to an interior surface of the container 432. Further, the displacement member 500 may be removably or permanently connected to the container 432 via any suitable manner, such as via a connector or fastener for example. In an embodiment, the displacement member 500 is over-molded relative to a portion of the container 432, such as the second end 436 for example.

The displacement member 500 may be formed from a resilient or flexible material such that the displacement member 500 is transformable between a first configuration (FIG. 21) and a second configuration (FIG. 22). In an embodiment, the displacement member 500 is a diaphragm. However, it should be understood that a displacement member 500 formed from any suitable component is within the scope of the disclosure. When the displacement member 500 is in the first configuration, the displacement member 500 may be located partially, and in some embodiments wholly, external to the processing chamber 440 of the container 432. In embodiments where the displacement member 500 is mounted at an interior of the container 432, in the first configuration, the displacement member 500 may, but need not extend through the opening 437 formed in the second end 436 of the container 432. In the second configuration, the displacement member 500 extends inwardly into the processing chamber 440 of the container 432, towards the first end 434. In embodiments where the displacement member 500 is mounted at an exterior of the container 432, when in the second configuration, the displacement member 500 extends through the opening 437 formed in the second end 436 of the container 432.

The processing chamber 440 of the container 432 has a processing volume in which foods are processed. In an embodiment, a portion of the displacement member 500 defines a boundary of this processing volume, such as an upper boundary of the processing volume when the container 432 is attached to a food processing base 22 for example. The contour of the displacement member 500 may be selected such that the processing volume when the displacement member 500 is in the second configuration is reduced relative to the processing volume when the displacement member 500 is in the first configuration. When in the second configuration, the displacement member 500 occupies a portion of the processing chamber 440. In the illustrated, non-limiting embodiment, the portion of the displacement member 500 that is received within the chamber 440, such as the portion that extends through the opening 437 of the second end 436 for example, has a concave contour. Accordingly, when the displacement member 500 is in the second configuration and occupies a portion of the processing chamber 440, the remaining portion of the processing chamber 440, such as extending between the first end 434 of the container 432 and the surface of the displacement member 500 facing the first end 434 for example, defines the reduced processing volume.

Further, the displacement member 500 may have a similar but opposite contour, such as a convex contour for example, when the displacement member 500 is in the first configuration. In such embodiments, such as where a portion of the displacement member 500 is arranged external to the processing chamber 440 when in the first configuration, the processing volume of the container 432 includes not only the volume of the processing chamber 440 but also the additional volume defined by the portion of the displacement member 440 arranged external to the processing chamber 440. However, embodiments where the processing volume is generally equal to or even slightly less than the volume of the processing chamber 440 and/or the container 432 when the displacement member 500 is in the first configuration are also contemplated herein. In such embodiments, the contour of the displacement member 500 in the first configuration need not be generally equal and opposite to the configuration of the displacement member 500 in the second configuration.

In an embodiment, the displacement member 500 is transformable from the first configuration to the second configuration in response to a manual input, such as application of a force to the displacement member 500 by a user. The force may be applied directly to a surface of the displacement member 500, such as to a portion of the displacement member 500 adjacent to, within, or overlapping the opening 437, or alternatively, may be applied indirectly to another component coupled to or associated with the displacement member 500.

During a food processing operation, at least a portion of the first agitating member 442 is rotated about its axis X to process, for example, chop, cut, dice, blend, or mix, the contents of the food processing chamber. During a food processing operation, the contents of the food processing chamber 440 may be propelled outwardly, towards the sidewalls 438 of the container 432 and may stick thereto. To facilitate the return of these particles of food stuck to the sidewall 438 to the first end 434 of the container 432, the displacement member 500 is transformed to the second configuration. By pushing the displacement member 500 into the interior of the container 432, the volume of the processing chamber 440 is reduced. As a result, the pressure within the processing chamber 440 is increased, thereby pushing the food downwardly towards the cutting assembly 442. In an embodiment, this increased pressure acts on and loosens the stuck food particles within the container 432. This transformation of the displacement member 500 from the first configuration to the second configuration may occur when the first agitating member 442 is operational, or alternatively, when the rotatable blade 446 of the first agitating member 442 is stationary, such as after a processing operation or during a pause of a processing operation.

In response to further processing, such as rotation of the cutting assembly 442 about its axis X, the heat and pressure within the processing chamber 440 will increase. Because of its resilient nature, the increased pressure within the processing chamber 440 acting on a surface of the displacement member 500 will cause the displacement member 500 to deform. In an embodiment, this pressure will move the displacement member 500 through the opening 437, to an exterior of the container 432. Accordingly, this increased pressure generated by operation of the first agitating member 442 will ultimately transform the displacement member 500 from the second configuration back to the first configuration. Although the displacement member 500 is not illustrated or described herein as including a second agitating member, it should be understood that embodiments where a second agitating member is arranged within the interior of the container 432 and operably coupled to the displacement member 500 are also contemplated herein.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of displacing food particles in a food processing system, the method comprising:
    placing the food particles in a container body of the food processing system;
    agitating the food particles with an agitating member located at a first end of the container body; and
    extending the displacement member into a second end of the container body, while maintaining a seal at the second end to increase a pressure within the container body, whereby the pressure displaces the food particles within the container body.

2. The method of claim 1, further comprising mounting the first end of the container body to a food processing base.

3. The method of claim 1, wherein the container body includes a sidewall extending between the first and seconds end of the container body and an end wall oriented transverse to the sidewall, the end wall having an opening formed therein.

4. The method of claim 3, wherein extending the displacement member into the container body comprises extending the displacement member through the opening.

5. The method of claim 3, wherein extending the displacement member into the container body comprises transforming the displacement member between a first configuration and a second configuration.

6. The method of claim 5, wherein, in the first configuration, the displacement member has a convex contour.

7. The method of claim 5, wherein, in the second configuration, the displacement member has a concave contour.

8. The method of claim 5, wherein a contour of the displacement member in the first configuration is equal and opposite to the contour of the displacement member in the second configuration.

9. The method of claim 5, wherein the displacement member and the container body cooperate to define a processing volume.

10. The method of claim 9, wherein, when the displacement member is in the first configuration, the processing volume is equal to a volume of the container body.

11. The method of claim 9, wherein, when the displacement member is in the first configuration, the processing volume is greater than a volume of the container body.

12. The method of claim 9, wherein the processing volume when the displacement member is in the first configuration is greater than the processing volume when the displacement member is in the second configuration.

13. The method of claim 5, wherein transforming the displacement member from the first configuration to the second configuration comprises manually applying a force to the displacement member.

14. The method of claim 5, wherein transforming the displacement member from the first configuration to the second configuration comprises transforming the displacement member when the agitating member is stationary.

15. The method of claim 5, wherein transforming the displacement member from the first configuration to the second configuration comprises transforming the displacement member when the agitating member is operational.

16. The method of claim 5, further comprising transforming the displacement member from the second configuration back to the first configuration by increasing the pressure within the container body by rotation of the agitating member.

17. The method of claim 1, wherein the displacement member is formed from a resilient member.

18. The method of claim 1, wherein the displacement member is a diaphragm.

19. The method of claim 1, wherein the displacement member is over-molded relative to the second end of the container body.

20. The method of claim 1, wherein the agitating member comprises one or more blades.

* * * * *